(12) United States Patent
Tillet et al.

(10) Patent No.: US 9,515,724 B2
(45) Date of Patent: Dec. 6, 2016

(54) POSITION-BASED COMMUNICATION

(71) Applicant: IRIDIUM SATELLITE LLC, McLean, VA (US)

(72) Inventors: Daniel Tillet, McLean, VA (US); Joel Thompson, McLean, VA (US); Garrett Chandler, McLean, VA (US)

(73) Assignee: IRIDIUM SATELLITE LLC, McLean, VA (US)

( * ) Notice: Subject to any disclaimer, the term of this patent is extended or adjusted under 35 U.S.C. 154(b) by 0 days.

(21) Appl. No.: 15/016,808

(22) Filed: Feb. 5, 2016

(65) Prior Publication Data
US 2016/0233949 A1    Aug. 11, 2016

Related U.S. Application Data

(60) Provisional application No. 62/112,264, filed on Feb. 5, 2015.

(51) Int. Cl.
| | |
|---|---|
| *H04W 4/10* | (2009.01) |
| *H04B 7/185* | (2006.01) |
| *H04W 4/02* | (2009.01) |

(52) U.S. Cl.
CPC ......... *H04B 7/18545* (2013.01); *H04W 4/028* (2013.01); *H04W 4/10* (2013.01)

(58) Field of Classification Search
CPC ...... H04W 76/005; H04W 4/10; H04W 84/08; H04W 4/08; H04W 4/021; H04W 4/16; H04W 8/14; H04W 84/18; H04W 88/182; H04W 28/0226; H04L 65/4061; H04L 63/10; H04L 65/403; H04L 65/4038; H04L 12/1827; H04L 63/104; H04L 65/1093; H04B 17/391; H04B 17/382; H04M 2203/2044; H04M 2207/18; H04M 2215/2093; H04M 3/42348; H04M 3/56
See application file for complete search history.

(56) References Cited

U.S. PATENT DOCUMENTS

| | | | | |
|---|---|---|---|---|
| 6,564,066 | B1* | 5/2003 | Biggs | H04W 72/10 455/512 |
| 7,676,192 | B1* | 3/2010 | Wilson | H04H 60/41 455/3.01 |
| 2002/0102999 | A1* | 8/2002 | Maggenti | H04L 12/1822 455/518 |
| 2003/0154249 | A1* | 8/2003 | Crockett | H04W 4/08 709/204 |

(Continued)

*Primary Examiner* — Sujatha Sharma
(74) *Attorney, Agent, or Firm* — Baker Botts L.L.P.

(57) ABSTRACT

In one implementation, information indicating that a communication device is requesting to enter a dedicated transmission mode in a talkgroup may be received. In addition, information indicating a first position of the communication device may be received. A satellite constellation may be controlled to establish a first channel for communications for the talkgroup within a first beam that has a coverage area including the first position of the communication device. Further, a potential second position of the communication device may be determined. The satellite constellation may be controlled to establish a second channel for communications for the talkgroup within a second beam that has a coverage area including the potential second position of the communication device.

20 Claims, 16 Drawing Sheets

(56) References Cited

U.S. PATENT DOCUMENTS

| | | | |
|---|---|---|---|
| 2004/0005904 A1* | 1/2004 | Wolf ..................... | H04W 8/186 |
| | | | 455/519 |
| 2006/0223562 A1* | 10/2006 | Mathis ................. | H04W 84/08 |
| | | | 455/518 |
| 2007/0021052 A1* | 1/2007 | Boice ..................... | H04W 4/18 |
| | | | 455/3.01 |
| 2013/0315164 A1* | 11/2013 | Arur ................... | H04W 76/002 |
| | | | 370/329 |

* cited by examiner

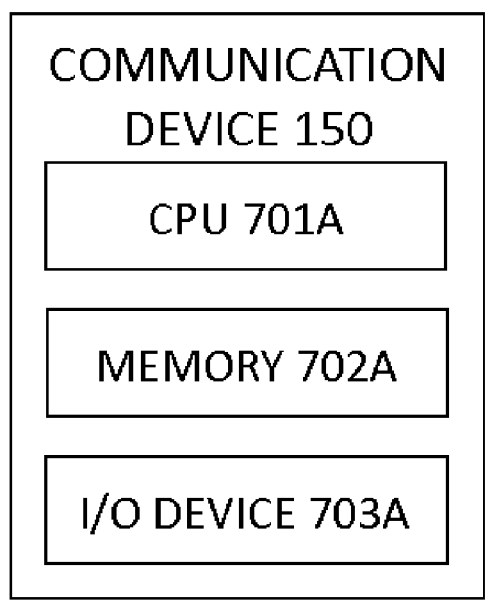 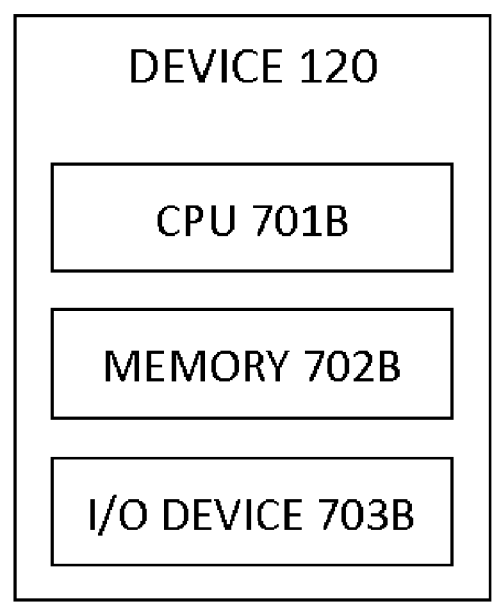
*FIG. 7A*  *FIG. 7B*

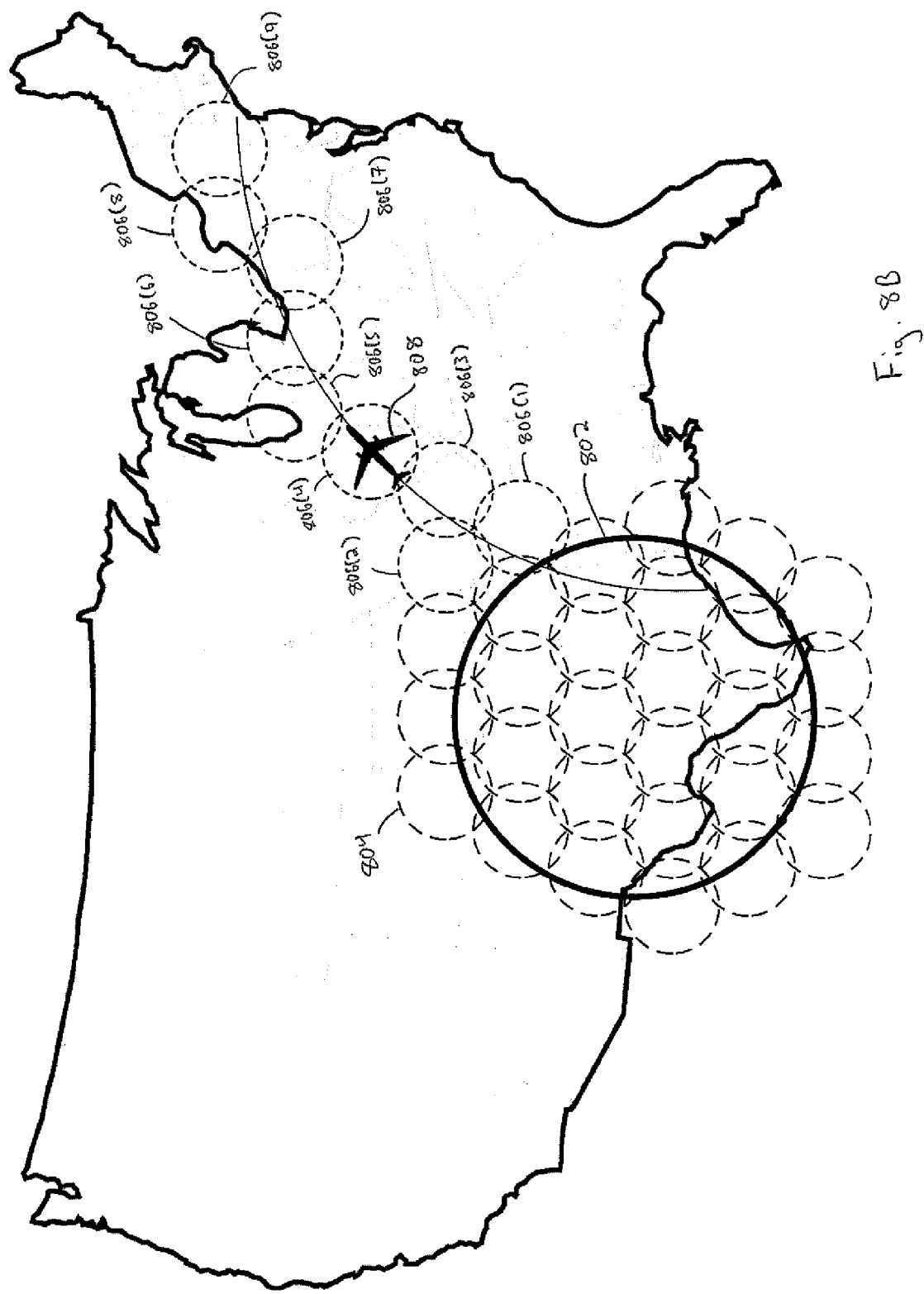

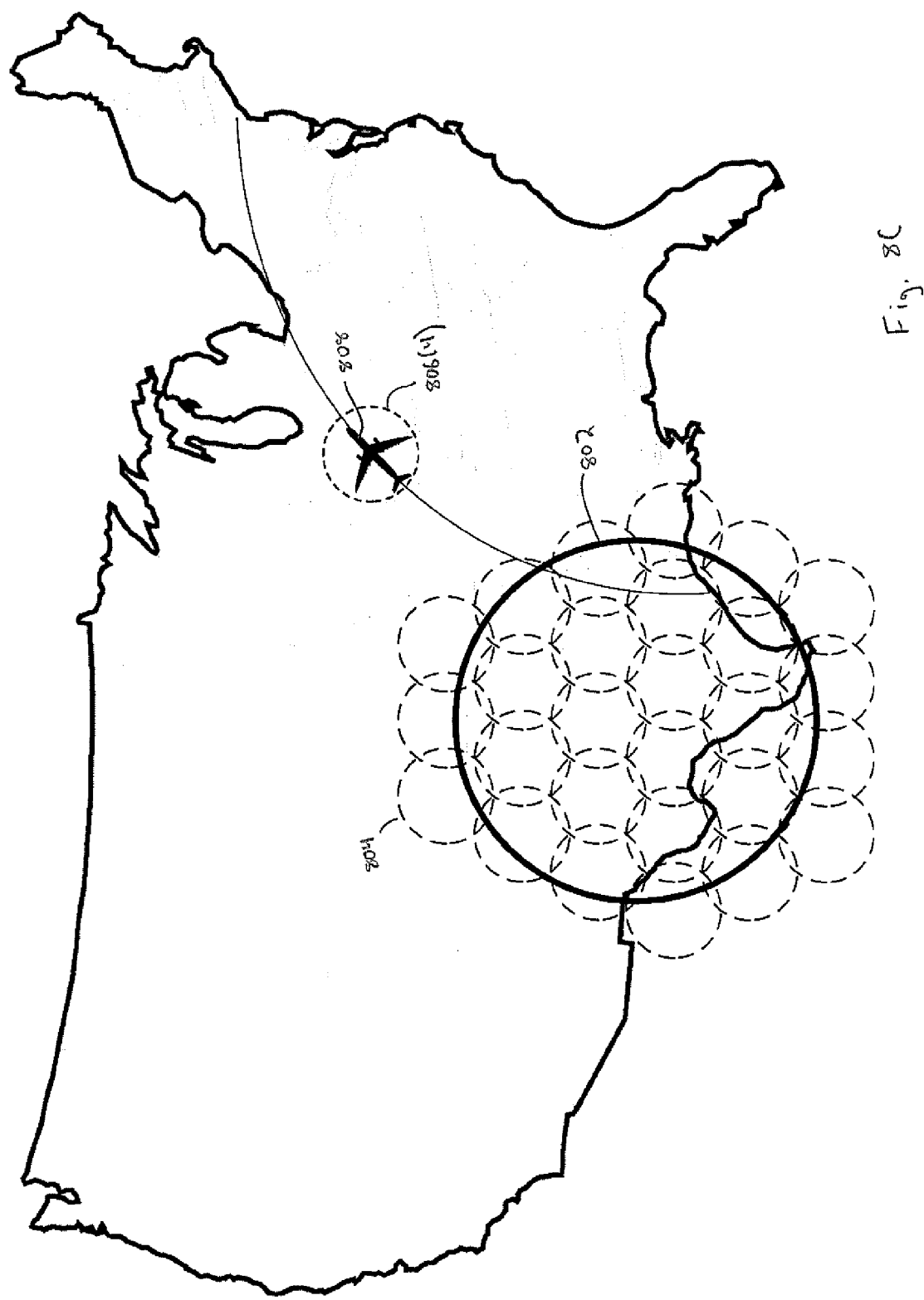

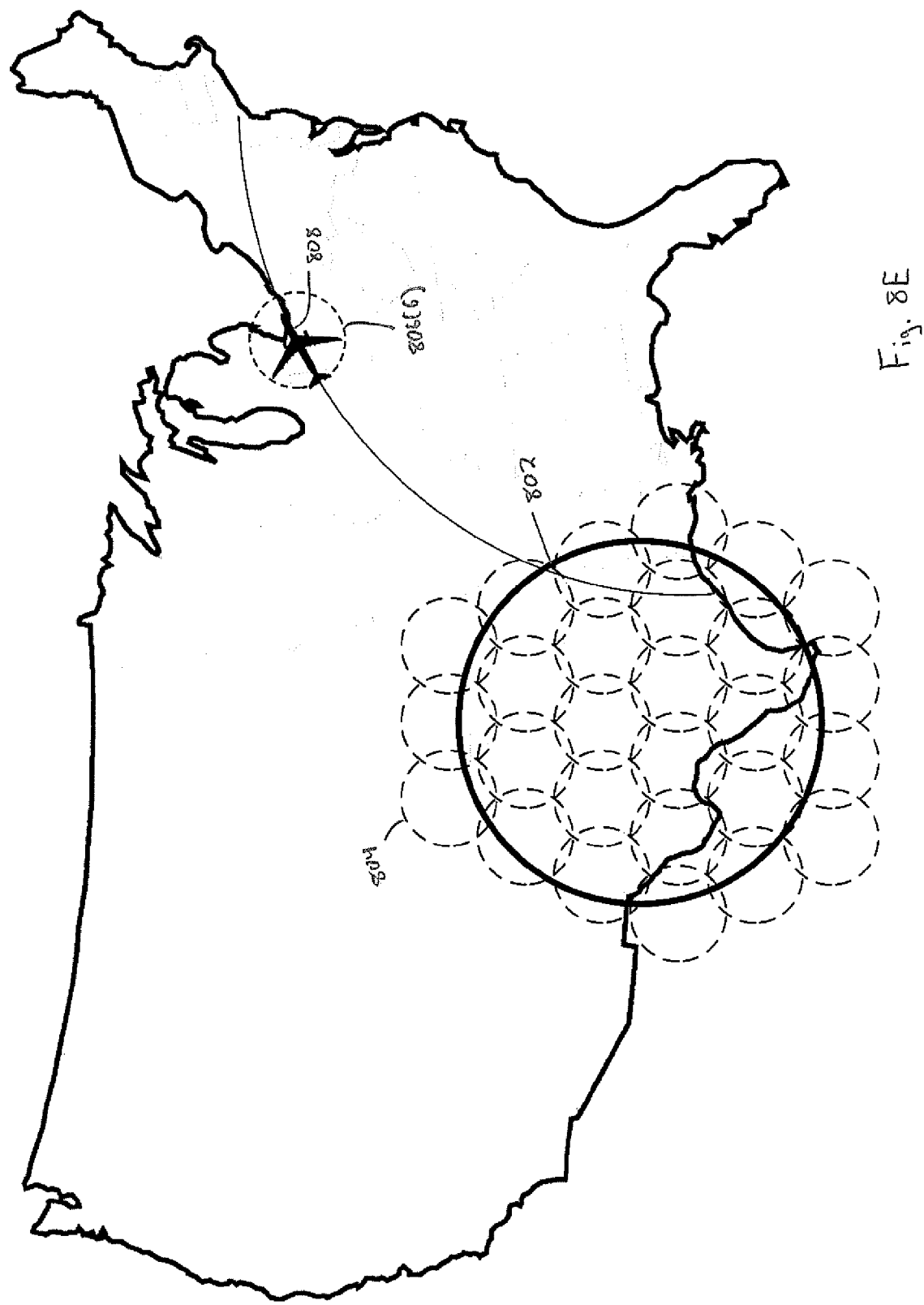

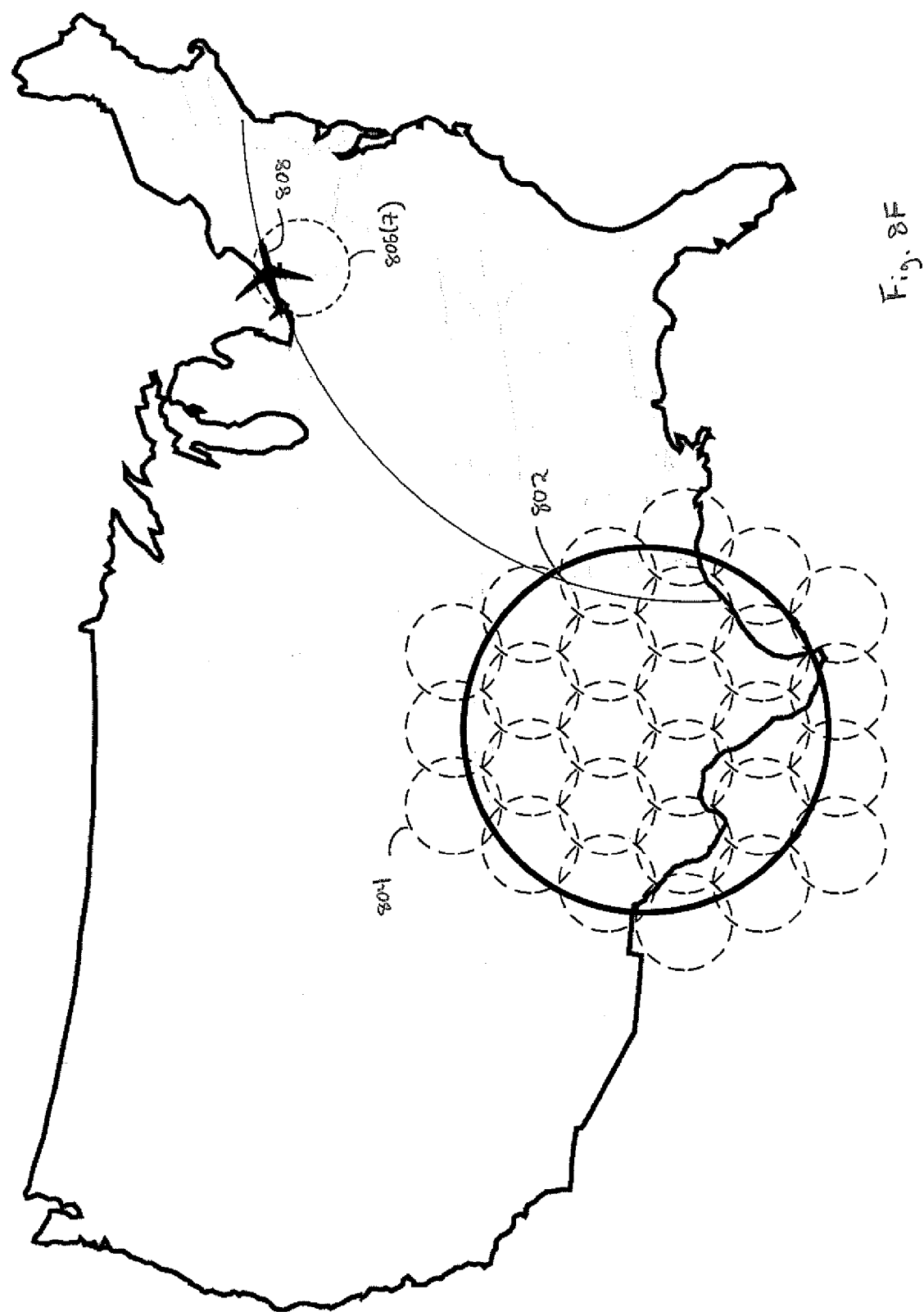

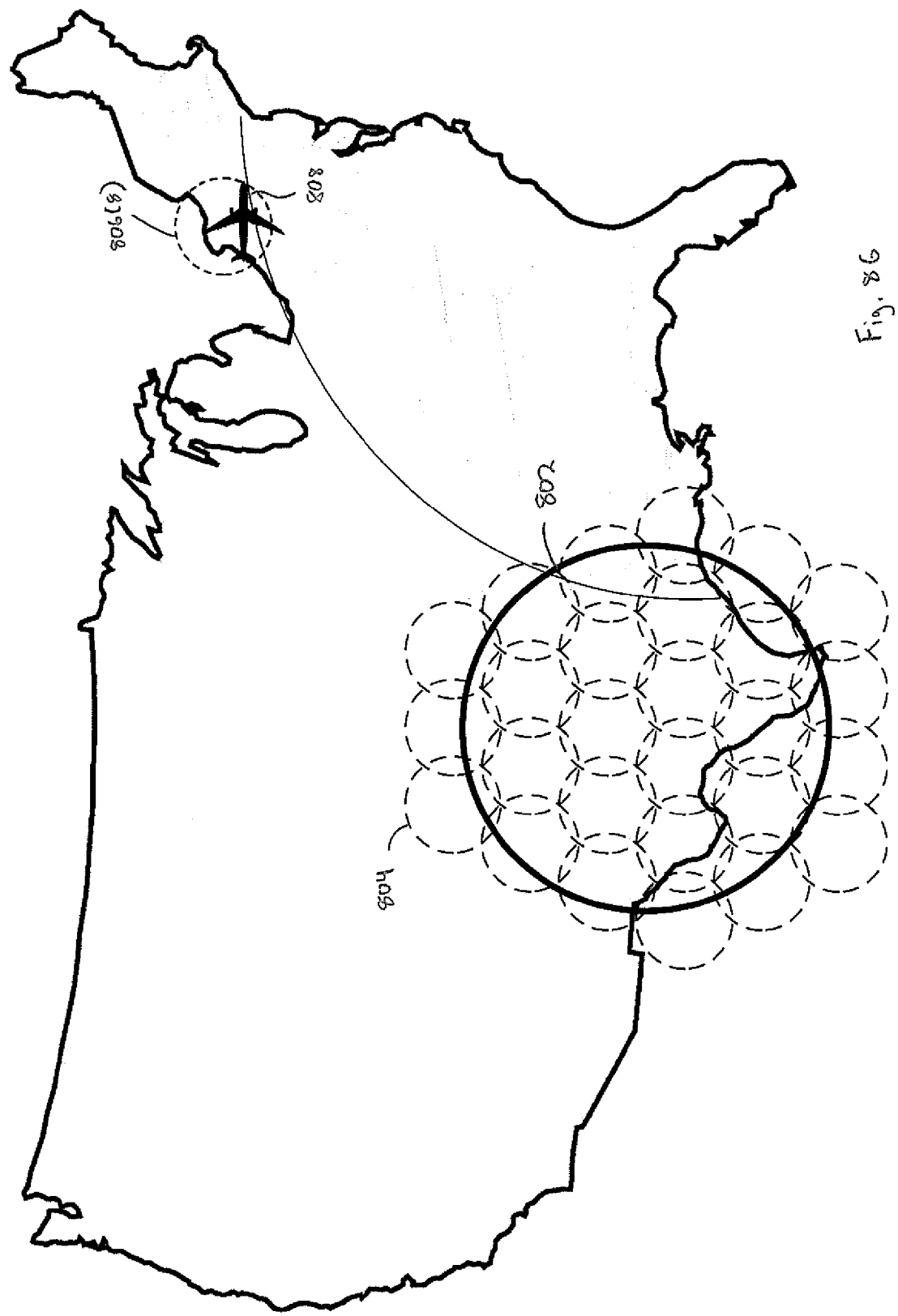

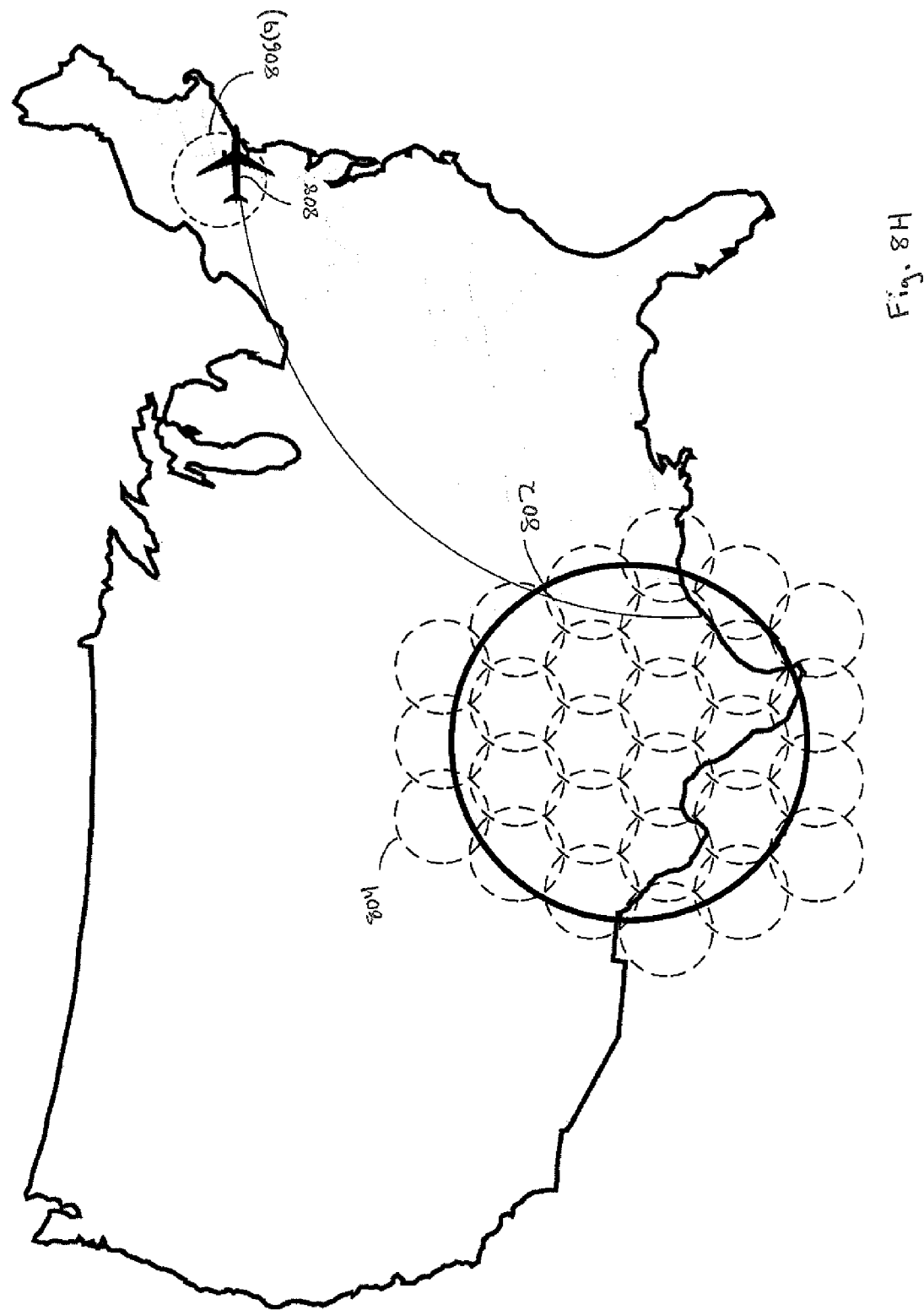

POSITION-BASED COMMUNICATION

CROSS-REFERENCE TO RELATED APPLICATION

This application claims the benefit of U.S. Provisional Patent Application No. 62/112,264 filed on Feb. 5, 2015, the disclosure of which is incorporated herein by reference in its entirety.

TECHNICAL FIELD

The disclosure relates generally to Push-To-Talk ("PTT") communication, and more specifically to position-based PTT communication.

SUMMARY

According to an implementation of the disclosure, a method may include receiving information indicating that a communication device is requesting to enter a dedicated transmission mode in a talkgroup. The method may also include receiving information indicating a first position of the communication device. Further, the method may include controlling a satellite constellation to establish a first channel for communications for the talkgroup within a first beam that has a coverage area including the first position of the communication device. In addition, the method may include determining a potential second position of the communication device. Further still, the method may include controlling the satellite constellation to establish a second channel for communications for the talkgroup within a second beam that has a coverage area including the potential second position of the communication device.

Other features of the present disclosure will be apparent in view of the following detailed description of the disclosure and the accompanying drawings. Implementations described herein, including the above-described implementation, may include a method or process, a system, or computer-readable program code embodied on computer-readable media.

BRIEF DESCRIPTION OF THE DRAWINGS

For a more complete understanding of the present disclosure, reference now is made to the following description taken in connection with the accompanying drawings.

FIG. 7A is a schematic diagram of a communication device configured to participate in a satellite communication system, including, for example, a satellite-based PTT system, in accordance with particular implementations of the present disclosure; and FIG. 7B is a schematic illustration of a device configured to implement one or processes for managing communication in a satellite communication system, including, for example, a satellite-based PTT system, in accordance with particular implementations of the present disclosure.

DETAILED DESCRIPTION

Figure 1:
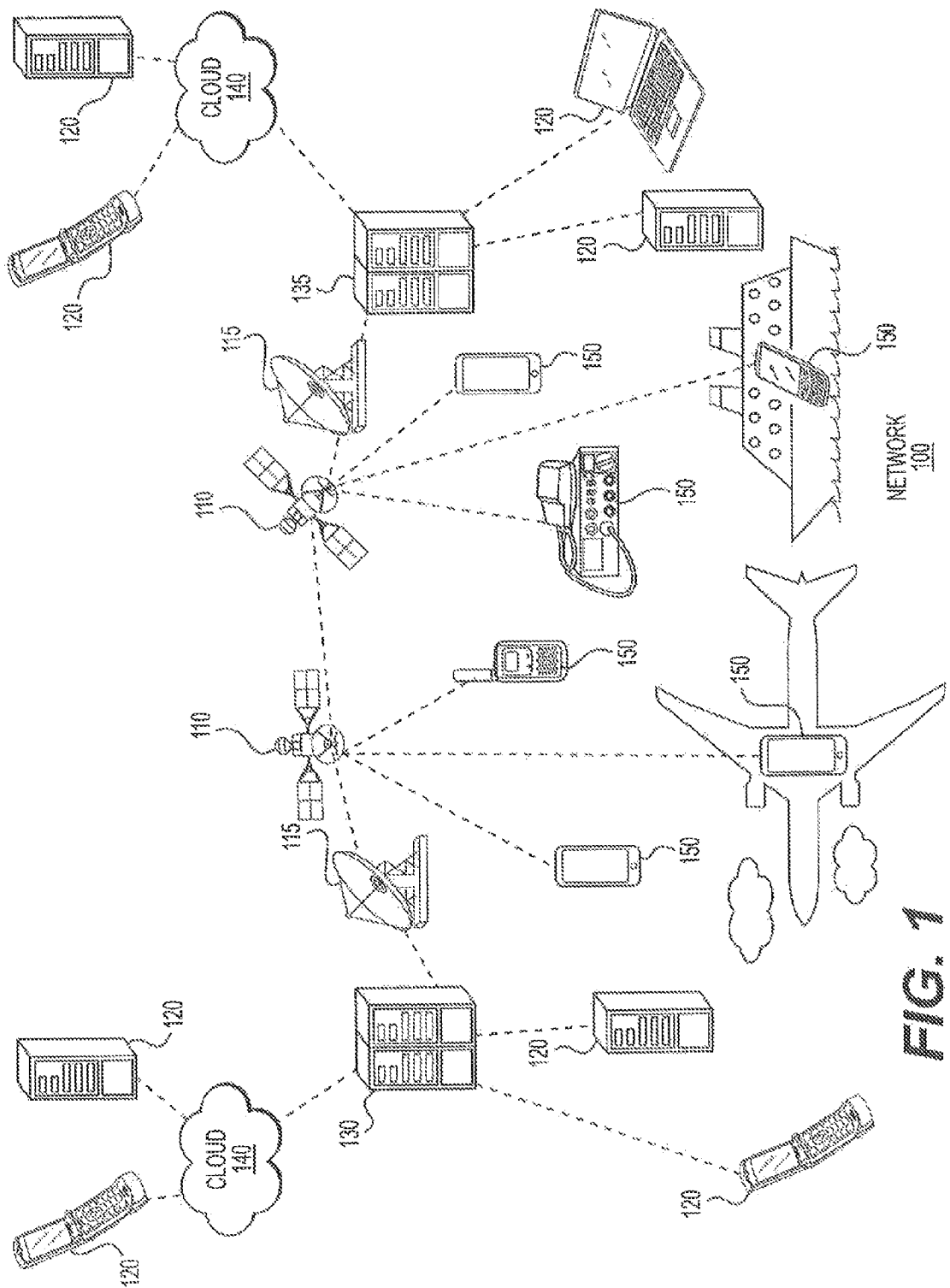
FIG. 1 is a block diagram of a network for satellite-based communications using one or more communication methods, in accordance with particular implementations of the present disclosure.

Various implementations set forth in this disclosure are described in relation to Push-To-Talk ("PTT") communication protocols implemented through a network of cross-linked satellites, but such implementations are not so limited and may be applied to many other communication protocols implemented through many other communication systems. In particular implementations set forth herein, the spatial positions of various targets (e.g., the communication devices 150 described herein) may be monitored, and communication nodes (e.g., the satellites 110 described herein) may enable communication with a target by transmitting and/or receiving electromagnetic carrier waves (e.g., communication signals) within a limited spatial region that is periodically readjusted to follow the position of the target. This may, for example, efficiently use or otherwise free up resources to enable communication with a plurality of other targets.

Target communication devices may be provisioned to participate in one or more PTT talkgroups (described below in more detail), and one or more users may use the target communication devices to communicate via one or more communication nodes. When a user uses a target communication device to take the floor in a PTT talkgroup (e.g., the user being a "speaker"), the user's communications may be transmitted to the communication node (e.g., a satellite 110 with a geographic footprint covering the location of a target communication device 110) and then relayed (e.g., either directly via a single satellite 110 or via satellite cross-links between a plurality of satellites 110) to communication devices of other users currently participating in the same PTT talkgroup (e.g., each of the other users being a "listener"). Thus, when a target communication device is within the geographic footprint of a communication node and has been provisioned to participate in a PTT talkgroup, a user of the target communication device may communicate with the users of other communication devices participating in the PTT talkgroup. In particular, PTT talkgroups may permit a speaking user of a device participating in a particular PTT talkgroup to simultaneously speak to all other users of devices currently participating in the particular PTT talkgroup.

In satellite-based implementations of PTT communication systems, a satellite may define one or more coverage beams covering portions of the Earth, each enabling communications with communications devices within different defined frequency bands. These beams facilitate PTT communication between a plurality of communication devices on the Earth.

A beam may have a footprint spanning a particular geographic region of the Earth. The footprint of the beam may be based on the characteristics of a satellite's antenna, such as, antenna geometry, antenna beam steering capabilities, transmission power, the frequencies that may be transmitted by the antenna, and the efficiency or quality of the antenna, for example. In some implementations, a beam's footprint may be substantially circular with a radius of about 400 km. In other implementations, the radius of the beam's footprint may be substantially less than or greater than 400 km based on factors such as, for example, antenna geometry, the transmission power associated with the particular beam and sources of interference (e.g., mountains, trees, buildings, electromagnetic radiation sources). In some implementations, each satellite within a constellation of satellites may define a plurality of beams, and each such beam may cover a different geographic region. Furthermore, certain satellites may move relative to the Earth over time, such that the geographic regions covered by the footprints of beams associated with such satellites also change over time. Other satellites may be geostationary, and the geographic regions covered by the footprints of beams associated with such satellites may remain fixed in time. Moreover, some satellites may be configured to redirect beams to cover different geographic regions over time or to change power characteristics or other settings of a beam such that the size of the geographic region within the footprint of the beam may be changed.

In some implementations, satellites may establish a geographic footprint by covering a geographic area with a plurality of different beams, while, in other implementations, satellites may establish a geographic footprint by covering a geographic area with a single beam.

While tracking the positions of mobile communication devices provisioned to participate in a talkgroup, the system may periodically adjust the coverage region that is lit up, such that the coverage region follows the mobile communication devices as they move. For example, if a mobile communications device is on an airplane flying over an ocean, the position of the mobile communications device on the airplane may be tracked and portions of the airplane's flight path may be selectively lit up based on the airplane's speed and trajectory, such that the coverage region follows the airplane enabling the mobile device to continue to access talkgroups for which it is provisioned even while moving. Other examples for which such techniques may be effective include communication devices on, for example, cruise ships or cargo ships travelling the ocean, scientific research or military vessels in remote areas, transports associated with desert caravans, or other vessels operating and moving in remote areas.

Each beam provided by a satellite may include a plurality of carriers (e.g., channels, frequencies), for example. In some implementations, frequencies may be assigned within the full spectrum of the beam, and such frequencies may be shared by communication devices within the footprint of the beam. In other implementations, frequencies may be assigned within only a portion of the full spectrum of the beam. As described below in more detail, each beam may include one or more control channels (e.g., control channel 0) and a plurality of traffic channels (e.g., traffic channels 1, 2, 3, and 4). Accordingly, the one or more control channels and the plurality of traffic channels included in a particular beam may be available to the communication devices within the footprint of the particular beam. In some instances, however, interference sources may prevent some communication devices within the footprint of the particular beam from accessing the control channel and the plurality of traffic channels included in the particular beam.

In some implementations, beams from different satellites (or even from the same satellite) may create footprints that overlap with one another. In such cases, each communication device in such an overlapping region may only receive information from one control channel at a time. Consequently, the communication devices may be configured to select between the control channels associated with overlapping beams based on certain criteria. Such criteria may include, for example, one or more of the relative strength of the signal received within each beam (e.g., there may be a preference to select the control channel corresponding to the beam with a higher strength), whether the strength of the control channel currently being monitored is less than or equal to a particular signal level (e.g., there may be a preference to stay connected within the current beam until the signal strength becomes too low), a determination of whether the relative movement of the communication device is away from or toward a central region of one or more of the beams (e.g., there may be a preference to select a control channel associated with a beam that is moving closer to the communication device and is more likely to be used in future communications, rather than to select a control channel associated with a beam that is moving away from the communication device and is less likely to be used in future communications), and a determination of whether the communication device is currently communicating with communication devices within the footprint of one of the beams (e.g., there may be a preference to stay connected within the current beam if other communication devices also are within the current beam).

In particular implementations, position information for communication devices may be provided to one or more satellites. For example, each communication device may periodically transmit information including its position directly to a satellite. Alternatively, a satellite may receive position information about a communication device from another network node, such as a satellite that tracks positions of communication devices, a satellite that has previously received position information from the communication device, or a terrestrial-based node that obtains position information about communication devices, for example. Consequently, when one or more satellites in a network or one or more devices involved in controlling communications across the network know the position of a communication device, communications (e.g., calls, data transmissions) directed to the communication device may be routed through an appropriate communication node (e.g., a satellite able to generate or currently generating a beam with a footprint covering the geographic area including the position of the communication device) to the communication device based on the position information. In implementations in which satellites generate a plurality of beams, an appropriate beam with a footprint covering the geographic area including the position of the communication device may be selected based on the position information.

In particular implementations, talkgroups may be associated with particular coverage areas. For example, a talkgroup provisioned to a city fire department may be available only in a coverage area that is coterminous with the city's boundaries. In another example, a particular talkgroup may only be available in a geographic area covered by a particular beam from a particular satellite, especially, for example, in the case where the satellite is a geostationary satellite. In these particular implementations, for example, communication devices may only participate in a particular talkgroup when such communication devices are within the coverage area of the particular talkgroup. In some implementations, a satellite may only light up the coverage area for a particular talkgroup (or a portion thereof) when the satellite receives position information for one or more communication devices provisioned to participate in the talkgroup indicating that at least one communication device provisioned to participate in the particular talkgroup is located in (or is on course to enter within a particular time) the coverage area for the particular talkgroup (or the portion thereof). In other implementations, a satellite may only light up the coverage area for a particular talkgroup (or a portion thereof) when the satellite receives position information indicating that at least one communication device provisioned to participate in the particular talkgroup is located in (or is on course to enter within a particular time) the coverage area for the particular talkgroup (or the portion thereof) and such communication device has requested the floor (e.g., has been set to a dedicated transmission mode). In certain configurations, the coverage area of a talkgroup may be dynamically adjusted based on position information about one or more communication devices provisioned to participate in the talkgroup. For example, if a communication device provisioned to participate in a particular talkgroup moves out of the coverage area otherwise defined for a talkgroup, a satellite acting as a node for the talkgroup may receive position information about the communication device and adjust the coverage area for the talkgroup to include the new position of the communication device. In some implementations, an administrator may be responsible for defining or adjusting the coverage area of a talkgroup.

When communication devices provisioned to participate in a talkgroup travel at relatively high speeds and rapidly move across large areas, it may be inefficient to light up, or even define, an entire coverage area for the talkgroup in advance. For example, a plane may have a cruising speed of approximately 550 miles per hour. While PTT communications with a mobile communications device on such plane could be made available by lighting up a large geographic area, for example including the plane's entire flight path, with a plurality of beams from one or more satellites, such lighting up may involve establishing and holding open numerous channels across a large number of beams even though each of those channels may be used for only a short duration, if at all, potentially resulting in an inefficient use of resources.

In particular implementations, a satellite (or other device providing instructions to such satellite) may determine the current position of a communication device provisioned to participate in a talkgroup (or predict a future position thereof) based on received information about the position of the communication device. The satellite may then light up a coverage area that includes the current position of the communication device and that is large enough such that the communication device will likely remain within the coverage area for a particular period of time. Thereafter, the satellite (or other device) may determine a new current position of the communication device (or predict a future position thereof) and adjust the position of the one or more beams to change the coverage area, such that the new current position of the communication device remains in the coverage area and such that the communication device will likely remain within the changed coverage area for another period of time. Alternatively, in some implementations, rather than adjusting the position of the one or more beams, the satellite (or other device) may light up one or more new beams and deactivate one or more previously lit up beams in order to appropriately change the coverage area to follow the communication device as it moves. Consequently, a tight coverage area may be lit up around the communication device as it moves that may enable the communication device to be available for communicating within the talkgroup in a manner that more efficiently uses network resources than lighting up a large coverage area (e.g., for an extended period of time). As described in connection with the foregoing implementations, the coverage area for a talkgroup may be dynamically adjusted to follow the path of a communication device provisioned to participate in the talkgroup.

In some implementations, a satellite receives position information about a communication device periodically (e.g., approximately every 5 minutes) and establishes, based on the position of the communication device, a channel for communications for the talkgroup within a first beam with a coverage area expected to be large enough to cover the communication device for a period of time (e.g., 5 minutes). The satellite also may establish, based on the position information for the communication device (e.g., including a heading of the communication device derived from the position information), a second channel for communications for the talkgroup within a second beam that has a coverage area that will likely cover the communication device at some point in the relatively near future (e.g., when the communication device leaves the coverage of the first beam). Eventually (e.g., after 5 minutes have passed), the satellite may receive new position information about the communication device and may use the new position information to determine how, if at all, to adjust the coverage area to continue to cover the communication device as it moves. In addition, the satellite may discontinue the first channel within the first beam and establish, based on the new position information (e.g., including a new heading of the communication device derived from the new position information), a third channel for communications for the talkgroup within a beam that has a coverage area that will likely cover the communication device at some point in the relatively near future (e.g., when the communication device leaves the coverage of the second beam). This process may be repeated along the entire path of the communication device. If the path spans coverage areas of multiple satellites, each satellite may generate channels for communications for the talkgroup within one or more of its beams and hand the channels off between its individual beams and other satellites as appropriate. In some implementations, this process may only be performed for a communication device after the satellite or another device determines that the communication device is a member of (or otherwise has rights to access) a talkgroup supported by the satellite system.

Particular implementations disclosed herein may adjust satellite coverage areas quickly enough to enable communication devices in vessels moving at high speeds, such as supersonic and hypersonic speeds, to participate in talkgroups while utilizing relatively tightly-focused coverage areas.

In certain implementations, a communication device may periodically attempt to provide its position information to a satellite. For example, if the communication device is at a position that has been lit up by a satellite for the talkgroup, the communication device may successfully provide its position information to the satellite. If the communication device is at a position that has not been lit up by a satellite for the talkgroup, the communication device may be unable to provide its position information to a satellite. Consequently, one or more satellites may maintain lists of each communication device provisioned to participate in a particular talkgroup including the most-recently received position information for such communication device. When the particular talkgroup becomes active (e.g., when a communication device requests to take the floor in an inactive talkgroup), one or more satellites may establish channels for communications for the talkgroup in one or more beams provided by the satellites (i.e., the satellites may light up one or more beams or coverage areas) that include the position of each communication device identified by the most-recently received position information. In some implementations, the satellite(s) may initially light up large coverage areas until updated position information for one or more of the communication devices is received, and then the satellite(s) may tighten the coverage areas based on the updated position information. This may increase the likelihood that all communication devices provisioned to participate in the talkgroup are included in a lit up coverage area.

In some implementations, a communication device may transmit its position information to a satellite via a control channel (e.g., instead of a traffic channel). In such implementations, the satellite(s) may periodically (e.g., every 5 minutes) light up beams for a limit a particular talkgroup to make one or more control channels available to communication devices provisioned to participate in the talkgroup that are located within the beams. In particular implementations, a communication device may be configured to transmit its position information to the satellite(s) in response to determining that the control channel is available. Consequently, the communication device may periodically transmit its position information to the satellite, and the satellite may light up targeted coverage areas based on the received position information. Moreover, the control channel may be available only for a limited period of time (e.g., 30 seconds), which may further reduce power requirements or free up the satellite's resources for other purposes.

As described above, certain implementations of satellite-based PTT communication utilize talkgroups for which geographic coverage area(s) are defined in advance without any systematic intelligence as to the actual locations of devices provisioned to participate in the talkgroups. In such implementations, a PTT manager or administrator within an operational entity (e.g., a dispatcher or other command and control mechanism) may determine where communication devices provisioned to participate in a particular talkgroup are likely to be located at a given point in time and define the geographic coverage area(s) for the particular talkgroup in a manner that is intended to include as many of the communication devices provisioned to participate in the talkgroup as possible. For example, if the PTT manager determines that most of the communication devices provisioned to participate in a talkgroup are likely to be located in the continental United States during a given time period, the PTT manager may select a coverage area for the talkgroup that is as closely aligned to the continental United States as possible. Further, the PTT manager may modify the coverage area(s) for the talkgroups over time as deemed necessary.

In some implementations, as a talkgroup is instantiated, control and traffic channels are allocated within selected beams to cover the full coverage area defined for the talkgroup (or some portion thereof). If the coverage area is increased, beams may be added to expand the coverage, and channels within those beams allocated for the talkgroup's use. Because satellite systems may not be spectrum rich and may have a finite capacity, a spot beam technology that provides only a relatively small number of channels for a given area at any point in time may benefit from an efficient allocation of channels, for example by not establishing a channel for a particular talkgroup within a beam if there are no devices provisioned to participate in the talkgroup within that beam.

In particular implementations of satellite-based PTT systems, the locations of mobile communication devices provisioned to participate in a talkgroup may be tracked enabling such satellite-based PTT systems to provide dynamic coverage areas that adjust as the mobile communication devices move in a fashion that may be referred to herein as "follow me" coverage. In particular, a recurring message may be sent from a communication device to a PTT operations hub (e.g., through the satellite network). This message may include logistical information including global positioning satellite ("GPS") coordinates of the communication device or other location information for the communication device. These GPS coordinates may permit the PTT operations hub to know where the communication device is and to predict where the communication device is headed and to utilize this information for PTT talkgroup sessions that are instantiated by others. In some implementations, individual communication devices may be equipped with GPS (or other navigation system) receivers and associated processing resources that enable the communication devices to determine their locations based on received GPS (or other navigation system) signals.

In some implementations, when activity occurs on a talkgroup of which a "follow me" communication device is a member, the communication device may be notified of this activity and may participate in communication via that talkgroup. For example, if the communication device is monitoring the traffic of a specific talkgroup and that specific talkgroup becomes active, the system may determine the current location of the communication device based on location information previously provided by the communication device and light up a beam that provides coverage of the current location of the communication device for the talkgroup.

Particular implementations of satellite-based PTT communication systems may allocate at least one signaling channel within one or more relevant beams to track the location of a communication device by "following" the communication device as the communication device moves and receiving position information for the communication device as it moves. Due to the high speeds of vehicles, such as planes, in comparison to the size of beam footprints, it may be beneficial to obtain position information at relatively small intervals. For example, commercial planes may travel at 600 miles an hour at their top speeds, and, consequently, it may be beneficial to obtain GPS location information from communication devices on such a plane every few minutes or so (or even more frequently) to provide sufficient time to adjust the beam or light up new beams.

In some implementations, when a user of a communication device desires to participate in a talkgroup or to instantiate a talkgroup, the user may interact with the communication device to cause the communication device to request to join the talkgroup or request the floor (e.g., by pushing a PTT button), for example. Such a request to join or instantiate a talkgroup triggers an instruction to allocate a traffic channel in the same manner as the signaling channel (e.g., by monitoring the device location). The traffic channel may then stay active as long as the talkgroup session stays active and may be torn down with the rest of the resources for that talkgroup when the talkgroup becomes inactive.

Figure 8A:
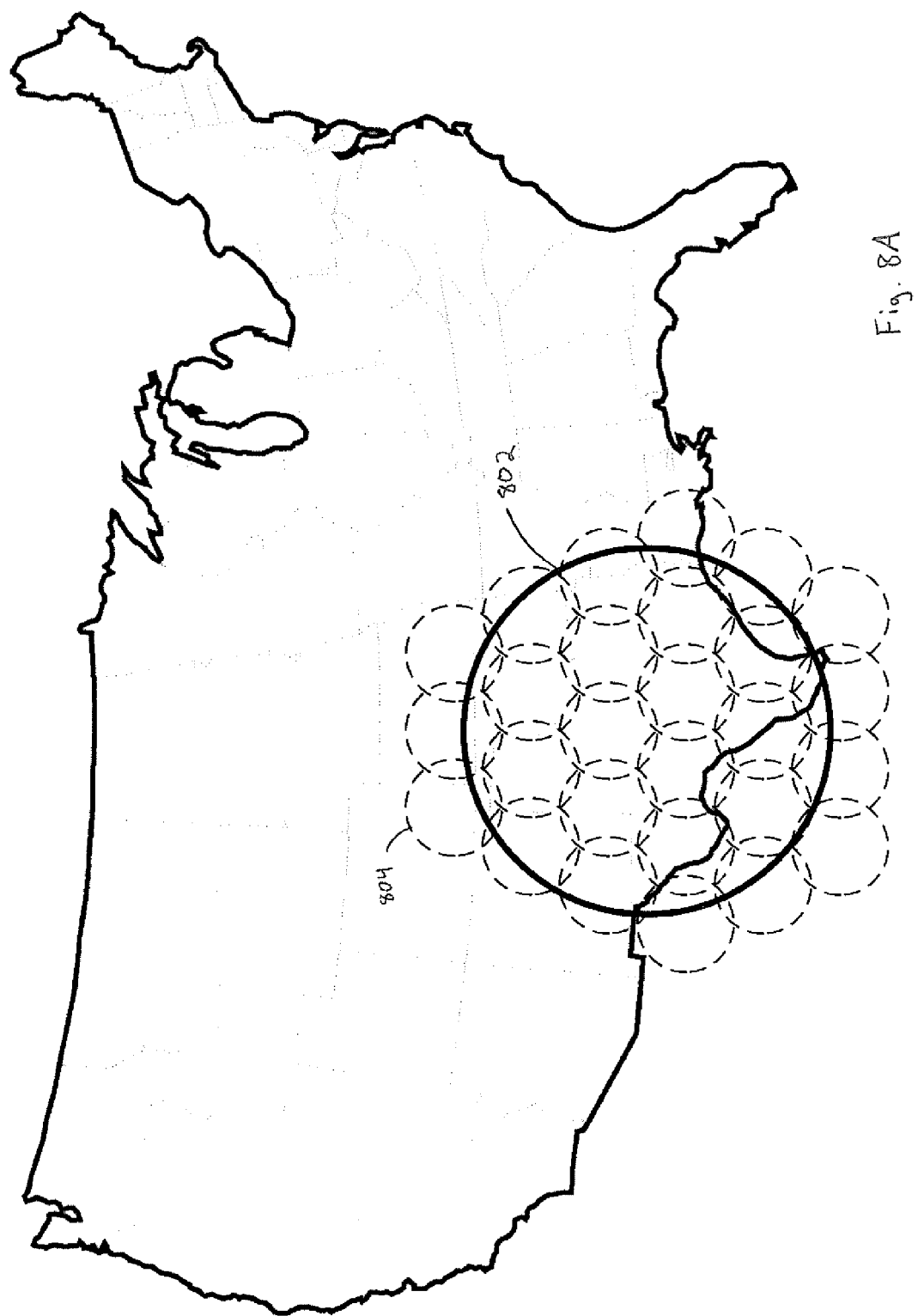
FIGS. 8A-8H and FIGS. 9A-9D are schematic diagrams of satellite-based implementations of push-to-talk systems, in accordance with particular implementations of the present disclosure.
Figure 8O:
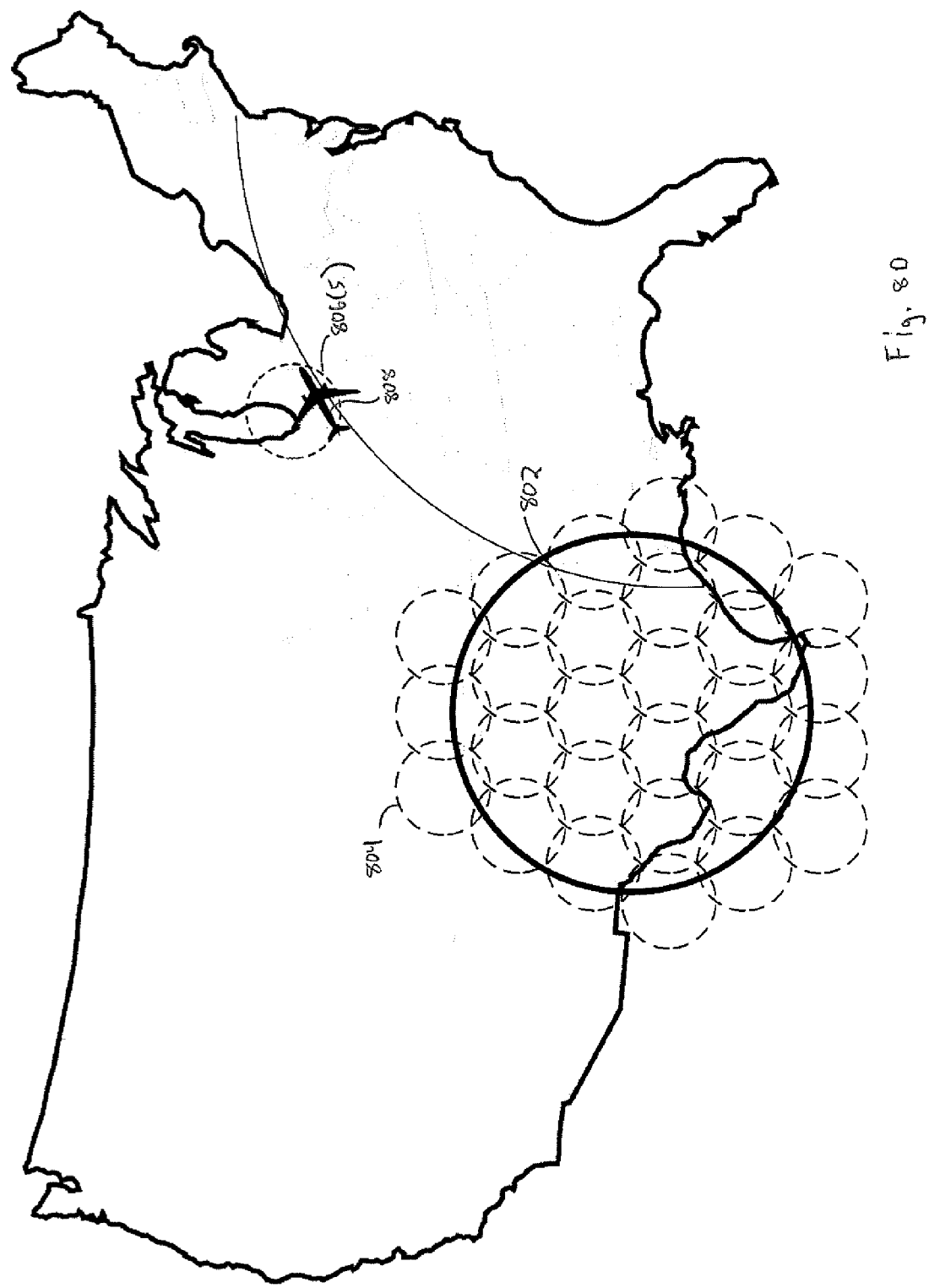
Figure 9B:
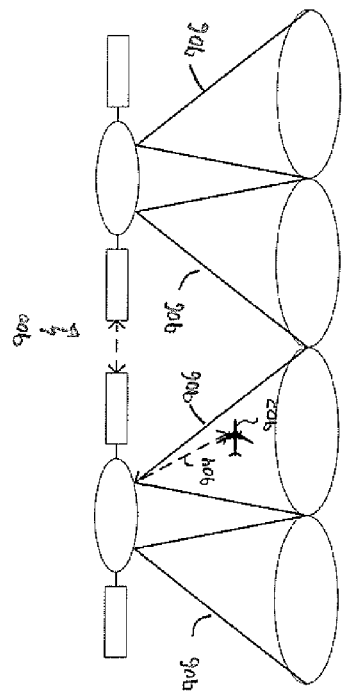
Figure 9D:
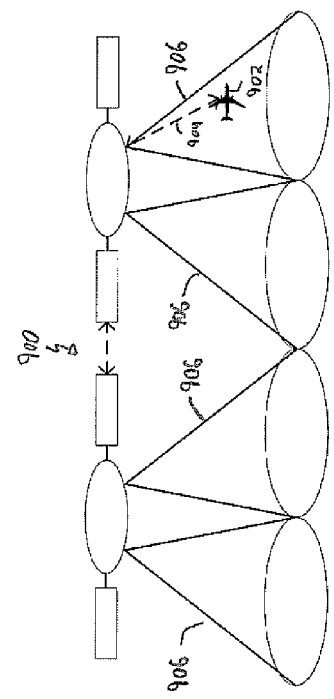
Figure 9A:
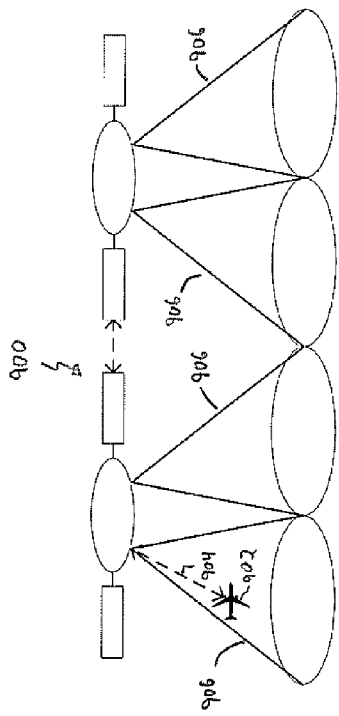
Figure 9C:
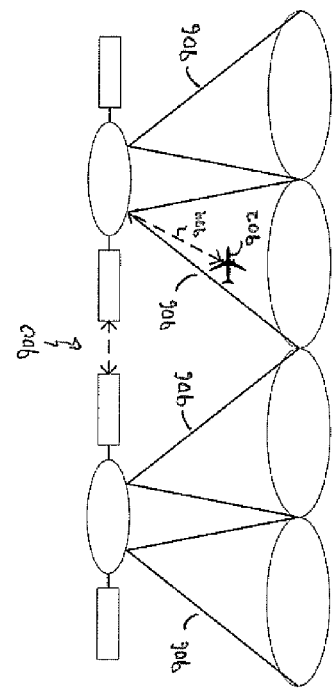

Referring first to FIG. 8A, a satellite-based PTT system allows an administrator to define a coverage area for a talkgroup by using one or more geometric shapes to define boundaries around one or more regions of the Earth. Such a coverage area may be a single, contiguous area or it may include multiple non-contiguous areas. Furthermore, after being defined, the coverage area for the talkgroup may be referred to as a statically defined coverage area. Nevertheless, the coverage area for the talkgroup may be redefined at some later time such that it is not necessarily permanently, statically defined, but rather is statically defined for a particular period of time.

As illustrated in FIG. 8A, an administrator has defined the coverage area for a talkgroup using a circle 802 that encompasses virtually all of the state of Texas. The satellite-based PTT system interprets the coverage for the talkgroup defined by the administrator and configures the satellite network to provide coverage for the talkgroup within the defined coverage area for the talkgroup 802 such that, when the talkgroup is active, any communication device provisioned to participate in the talkgroup that is located within the coverage area for the talkgroup 802 will have access to the talkgroup. For example, as illustrated in FIG. 8A, while the talkgroup is active, the satellite-based PTT system may cause the satellite(s) to allocate both control and traffic channels for the talkgroup within all of the beams 804 that cover the defined coverage area for the talkgroup 802. In some such implementations, while the talkgroup is active, the satellites may broadcast communications from the communication device that currently has the floor on traffic channels (e.g., half duplex traffic channels) in all of the beams 804 that cover the defined coverage area for the talkgroup 802, thereby enabling communication devices provisioned to participate in the talkgroup that are located within the coverage area for the talkgroup 802 to receive the communications from the communication device that currently has the floor. When the talkgroup transitions to being inactive, the control and/or traffic channels allocated to the talkgroup in the defined coverage area for the talkgroup 802 may be torn down. Subsequently, a communication device provisioned to participate in the talkgroup may re-instantiate the talkgroup by requesting that the talkgroup be reactivated. In response, the satellites may allocate control and traffic channels for the talkgroup in all of the beams 804 that cover the defined coverage area for the talkgroup 802, thereby enabling communication devices provisioned to participate in the talkgroup to access the traffic channels for the talkgroup based on information provided in the control channels.

In the example illustrated in FIG. 8A, the administrator may represent a regional airline that provides flights to and from various locations in the state of Texas, and the airline's aircraft may be equipped with communication devices provisioned to participate in a talkgroup associated with the regional airline, for example, to enable aircraft crews to communicate with other aircraft crews as well as the regional airline's home office in a PTT environment. Assuming the regional airline operates many flights throughout Texas at any given point in time, the airline's communication device density within the defined coverage area for the talkgroup 802 may be relatively high, and the approach to providing coverage for the talkgroup within the defined coverage area for the talkgroup 802 described above may be reasonably efficient.

However, if the regional airline also operates infrequent flights from Houston to New York City (e.g., one or two flights daily) and desires to enable the crews onboard flights from Houston to New York City to participate in the talkgroup, it may be an inefficient use of the satellite-based PTT system's resources to allocate channels (e.g., control and/or traffic channels) for the talkgroup within each beam covering the flightpath from Houston to New York City 806(1)-806(9) while the talkgroup is active as illustrated in FIG. 8B, for example, due to the relatively low likelihood that the one of the regional airline's aircraft 808 will be located within those beams at any given point of time.

Accordingly, the satellite-based PTT system may track the position of the communication device onboard an aircraft 808 that is outside of the defined coverage area for the talkgroup 802 and/or predict the future position of the aircraft 808 and attempt to allocate channels (e.g., control and/or traffic) for the talkgroup while the talkgroup is active in only those beams 806(1)-806(9) where the aircraft is located or is deemed likely to be located at particular instances in time, for example as illustrated in the series of FIGS. 8C-8H. As illustrated in FIGS. 8C-8H, while the talkgroup is active, the satellite-based PTT system continues to allocate channels for the talkgroup in the beams 804 that cover the defined coverage area for the talkgroup 802 while also allocating channels for the talkgroup in individual ones of beams 806(1)-806(9) that the satellite-based PTT system determines cover or are likely to cover the aircraft 808 at particular instances in time.

In some implementations, the communication device onboard the aircraft 808 may include or otherwise have access to a GPS receiver or some other location-sensing device and associated processing capability that enables the communication device to determine its location and, in some implementations, related information such as the communication device's speed, heading, elevation, etc. The communication device may occasionally transmit information about its position (e.g., including its current position, speed, heading, and/or elevation) to the satellite-based PTT system, for example via a control or other channel within a beam that covers the aircraft 808 provided by a satellite. The satellite-based PTT system may use this information received from the communication device to determine the current position of the communication device and/or predict one or more future locations of the communication device.

As illustrated in FIGS. 8C-8H, when the talkgroup is active, the satellite-based PTT system may allocate one or more channels to the talkgroup (e.g., control and/or traffic) within one or more beams that the satellite-based PTT system determines cover or are likely to cover the current position of the communication device so that the communication device can participate in the talkgroup. In some implementations, this may involve the satellite-based PTT system broadcasting communications from the communication device that currently has the floor on traffic channels (e.g., half duplex traffic channels) allocated to the talkgroup within the one or more beams that the satellite-based PTT system determined cover or are likely to cover the current position of the communication device. In alternative implementations, this may involve the satellite-based PTT system establishing one or more dedicated traffic channels within beams that are outside of the defined coverage area for the talkgroup 802 with the communication device such the satellite-based PTT system unicasts communications to the communication device from the other communication device in the talkgroup that currently has the floor.

This concept also is illustrated in the series of FIGS. 9A-9D in connection with a satellite-based PTT system having multiple cross-linked satellites 900. As an aircraft 902 equipped with a communication device provisioned to participate in a talkgroup changes position, the satellite-based PTT system tracks the aircraft's 902 position and allocates channels for the talkgroup 904 within the beam(s) 906 that the satellite-based PTT system determines are likely to cover the aircraft 902 during particular windows of time but not other beams 906.

Referring now to FIG. 1, a network 100 may facilitate communication between communication devices using one or more communication methods. Specifically, FIG. 1 illustrates a block diagram of a network for satellite-based communication using one or more communication methods. Network 100 may comprise a plurality of satellites 110, each of which may permit the exchange of information and services among devices that are connected via satellites 110. Network 100 may also comprise a plurality of satellite links 115 (e.g., Earth-based satellite dishes, vehicle-based satellite dishes, high-power transmitters and receivers, antennas, Earth terminals, teleports) that may be configured to communicate with the one or more satellites 110 and relay data back and forth with the one or more satellites 110. In certain implementations, network 100 may comprise a plurality of cross-linked satellites 110 that effectively form a network between satellites 110 across which communications can be transferred. In other implementations, for example, network 100 may comprise one or more satellites 110 and each such satellite 110 may not directly connect to another satellite 110. In such other implementations, each satellite 110 may have a "bent pipe" architecture in which satellites 110 may only connect indirectly with one another through terrestrial-based systems, for example.

In addition, network 100 may comprise one or more management centers 130 (e.g., a Network Operations Center ("NOC") and/or a gateway for interfacing the satellite-based portion of network 100 to one or more terrestrial-based portions of network 100) configured to connect to at least one of the plurality of satellites 110. A management center 130 may comprise one or more locations (e.g., devices) that may monitor, control, or manage network 100. Each management center 130 may manage and monitor one or more satellites 110. For example, management center 130 may control movement or positioning of a satellite 110, may receive and monitor communications between a satellite 110 and other devices, or may determine when satellite 110 needs maintenance. In some implementations, a dedicated management center 130 may be established for each satellite 110. Alternatively, in some other implementations, a management center 130 may manage and monitor a plurality of satellites 110. In such implementations, management center 130 may connect directly with only one satellite 110 that is within range for direct communication with management center 130 via satellite link 115, or possibly a few satellites 110 that are within range of satellite link 115, and management center 130 may indirectly manage and control other satellites 110 in network 100 through cross-linked communications between the satellite (or satellites) 110 within range of satellite link 115 and satellites 110 outside of the range for direct communication with management center 130 via satellite link 115.

In some implementations, one or more satellites 110 may maintain a geostationary orbit, and management center 130 may always directly communicate, via satellite link 115, with the same satellite 110 that always remains in a geostationary position within range for direct communication with management center 130 via satellite link 115, for example. In other implementations, one or more satellites 110 may not maintain a geostationary orbit, and management center 130 may directly communicate with different satellites 110 at different times based on which satellite 110 or satellites 110 are within range for direct communication with management center 130 via satellite link 115 at any given time.

Management center 130 may be connected to one or more clouds 140, which may be public clouds, private clouds, or community clouds. Each cloud 140 may permit the exchange of information and services among devices (e.g., management center 130) that are connected to such clouds 140. In certain implementations, cloud 140 may be a wide area network, such as the Internet. In some implementations, cloud 140 may be a local area network, such as an intranet. Further, cloud 140 may be a closed, private network in certain implementations, and cloud 140 may be an open network in other implementations. Cloud 140 may facilitate the transmission of information among users or devices (e.g., management center 130, devices 120) that are connected to cloud 140 through any number of communication means, such as wireless transmission of information or wired transmission of information, for example. Management center 130 may integrate signals or data from satellites 110 with terrestrial systems, such as cellular networks, the public switched telephone network (PSTN), and/or the Internet via cloud 140, for example.

One or more devices 120 may connect with management center 130. Such devices 120 and management center 130 may transmit data therebetween. Devices 120 may include, for example, one or more general purpose computing devices, specialized computing devices, mainframe devices, wired devices, wireless devices, monitoring devices, infrastructure devices, other devices configured to provide information to service providers and users, telephones, mobile phones, computer devices, tablet computers, personal digital assistants, routers, switches, and any other suitable communication device. In certain implementations, for example, a device 120 connected with management center 130 may function as a management center and may mange a plurality of talkgroups (described in more detail below) assigned to a plurality of devices, such as communication devices 150 (described below in more detail), or organizations. In such implementations, the device 120 may establish, for example, connection orders for such talkgroups, priority settings for such talkgroups, home settings for such talkgroups, security settings or keys for such talkgroups, or other protocols for talkgroups.

Network 100 may include a plurality of gateways 135. Gateways 135 may function similarly to management center 130, except that gateways 135 may not have rights to control satellites 110 or responsibilities to manage satellites 110. In certain implementations, gateways 135 may communicate with satellites 110 via satellite links 115. In other implementations, gateways 135 may utilize other methods requiring less infrastructure, such as low power antennas, transmitters, or receivers, to communicate with satellites 110. For example, gateways 135 may serve as bridges between satellites 110, cloud 140, and devices 120 and may permit the free (or controlled) flow of data therebetween.

Network 100 may include a plurality of communication devices 150. Similar to devices 120, communication devices 150 may include, for example, one or more general purpose computing devices, specialized computing devices, mainframe devices, wired devices, wireless devices, monitoring devices, infrastructure devices, other devices configured to provide information to service providers and users, telephones, mobile phones, computer devices, tablet computers, personal digital assistants, routers, switches, and any other suitable communication device. Communication devices 150 may be configured to collect data from or provide data to one or more data sources (e.g., servers, networks, interfaces, other devices). For example communication devices 150 may collect information from network 100, management center 130, satellite link 115, satellites 110, and other devices connected to satellites 110, such as other communication devices 150. By collecting this information, communication devices 150 may perform one or more tasks associated with talkgroups, as discussed in more detail below, and other communication methods.

More particularly, communication devices 150 may establish direct communication with satellites 110 orbiting above their terrestrial positions. Accordingly, communication devices 150 may utilize satellites 110 to establish communication with other communication devices 150, with management center 130, with cloud 140, with devices 120, with gateway 135, and with any other suitable device or system. Communication devices 150 may include features similar to those of devices 120 and may similarly communicate with management centers 130 and gateways 135 in certain implementations.

Network 100 may be configured to facilitate PTT communication. PTT communication is a method of communicating that, in some implementations, uses may use half-duplex communication lines in which a communication device, such as a communication device 150, switches between a dedicated transmission mode and a dedicated reception mode, for example, for the purposes of communicating with one or more other communication devices that collectively may be referred to as a talkgroup. In some implementations of PTT communication, the communication device may be in the dedicated reception mode by default and may switch to the dedicated transmission mode only while a "talk" button is pushed or otherwise activated. In other implementations of PTT communication, the communication device may switch from the dedicated reception mode to the dedicated transmission mode in response to a first trigger, such as the selection of the dedicated transmission mode on the communication device, the detection of a particular sound (e.g., a user's voice, a particular word or command, a particular tone), or the receipt of any other instruction or command to switch to the dedicated transmission mode, and the communication device may remain in the dedicated transmission mode until a second trigger occurs and the communication device switches to the dedicated reception mode in response thereto. For example, the second trigger may include the selection of the dedicated reception mode on the communication device, the lapse of a particular period of time (e.g., 30 seconds, 1 minute, 5 minutes, 30 minutes, 1 hour) in the dedicated transmission mode, the absence of a particular sound (e.g., the user's voice), the detection of a particular sound (e.g., a particular word or command, a particular tone), or the receipt of any other instruction or command to end the dedicated transmission mode or to switch to the dedicated reception mode. In some instances, when a communication device is in the dedicated transmission mode, the device may be said to "have the floor" of the talkgroup.

Throughout this disclosure, PTT communications and communications more generally are described often in the context of voice communications. However, the systems and techniques described herein are not limited to communications involving voice. Rather, the systems and techniques described herein are more generally applicable to all forms of communication, including data communication. In fact, in some implementations, the communication devices engaging in PTT communications may not be user devices such as handsets and the like, but instead may be machine-to-machine ("M2M") or other data communication devices that, for example, generally may be referred to as facilitating the "Internet of Things" ("IoT"). For instance, the communication devices may interface with sensors or other types of data processing and/or generating devices and may be configured to participate in PTT communication sessions, for example, involving one or more other communication devices, to share data. In such implementations, the communication devices still may exchange data with other communication devices within a talkgroup using PTT techniques. Furthermore, while the term "PTT" or "push-to-talk" may suggest that something (e.g., a button) must be "pushed" (and, in some cases, held) in order for a communication device to "take the floor" or otherwise communicate in a dedicated transmission mode in a talkgroup, that is not necessarily the case. As described herein, there are various other mechanisms through which communication devices can "take the floor" or otherwise communicate in a dedicated transmission mode in a talkgroup, particularly in implementations where the communication devices are not user devices but instead are M2M or other data communication devices.

PTT communication may facilitate communication between a plurality of devices, such as communication devices 150, by establishing clear communication protocols that govern which communication device 150 "has the floor" (e.g., is set to a dedicated transmission mode) and which communication device or devices 150 are listening (e.g., are set to the dedicated reception mode). Consequently, PTT communication may efficiently allocate communication roles (e.g., either being in a dedicated transmission mode or being in a dedicated reception mode) among a group of communication devices 150.

In some implementations of PTT communication, communication systems other than or in addition to half-duplex communication lines may be used. For example, some implementations of PTT communication may utilize two-way (or full) duplex communication lines in which a plurality of communication devices 150 may simultaneously be in transmission modes. In such alternative implementations, for example, users of a plurality of communication devices 150 may speak simultaneously and may all be heard by users of other communication devices 150 connected with the speaking users.

In PTT communication, communication may occur via one or more traffic channels. A traffic channel may correspond to an electromagnetic wave, such as a radio wave, of a particular frequency. A plurality of communication devices may connect to one or more traffic channel. In particular, a communication device set to the dedicated transmission mode and connected to a particular traffic channel may transmit a communication over the traffic channel, e.g., by transmitting an electromagnetic wave at the frequency corresponding to the traffic channel, to communication devices set to the dedicated reception mode or network nodes (e.g., a satellite 110) connected to the traffic channel. For example, a user may speak into a first communication device set to the dedicated transmission mode and connected to the traffic channel; the first communication device may encode the user's message in a radio signal and transmit the radio signal over the traffic channel (e.g., to a satellite); one or more second communication devices set to the dedicated reception mode and connected to the traffic channel may receive the radio signal (e.g., retransmitted by the satellite), including the encoded message, over the traffic channel; and the one or more second communication devices may output the user's message in the user's voice to the respective users of the one or more second communication devices. In this manner, a communication device set to the dedicated transmission mode and connected to the traffic channel may transmit a communication (e.g., a voice communication, Morse code, a data packet) simultaneously to all (or some subset of all) other communication devices set to the dedicated reception mode and connected to the traffic channel. As described below in more detail, PTT communication may utilize talkgroups, which function similar to the traffic channels described above but allow communication between communication devices set to a plurality of different traffic channels.

In some implementations of PTT communication, only one communication device per traffic channel may be set to the dedicated transmission mode at a time. Consequently, if a communication device connected to a traffic channel is set to the dedicated transmission mode, the other communication devices connected to the traffic channel may not switch to the dedicated transmission mode until the communication device set to the dedicated transmission mode is switched to the dedicated reception mode or otherwise deactivated, even if a first trigger for switching one of the other communication devices to the dedicated transmission mode occurs. For example, if pushing a particular button on a particular communication device is the first trigger for switching the particular communication device to the dedicated transmission mode, in such an implementation, pushing the particular button may not switch the particular communication device to the dedicated transmission mode until after the communication device currently set to the dedicated transmission mode is switched to the dedicated reception mode or otherwise deactivated. In some implementations, when a first trigger for switching one of the other communication devices to the dedicated transmission mode occurs, the first trigger may also serve as a second trigger for switching the communication device currently in the dedicated transmission mode to the dedicated reception mode, which may allow one of the other communication devices to switch to the dedicated transmission mode.

PTT communication also may utilize a control channel that may carry information about each of a plurality of traffic channels. The control channel may correspond to an electromagnetic wave, such as a radio wave, of a dedicated frequency. The control channel may provide a data stream including, for example, information about one or more of the available traffic channels or about the traffic channels in aggregate. Such information may include, for example, the number of available traffic channels and the frequencies of available traffic channels. Alternatively or additionally, the data stream may include information about communication devices associated with the one or more available traffic channels including, for example, the number of communication devices connected to or waiting for each traffic channel, the types of communication devices connected to or waiting for each traffic channel, the length of time one or more communication devices have been connected to each traffic channel, whether a communication device connected to a particular traffic channel is set to the dedicated transmission mode, which communication device is currently set in a dedicated transmission mode on a particular traffic channel, the length of time a communication device has been set in a dedicated transmission mode on a particular traffic channel, the length of time a particular traffic channel has been active (e.g., an aggregate length of time that one or more communication devices have been set in a dedicated transmission mode on a particular traffic channel), which communication device is currently set in a dedicated reception mode on a particular traffic channel, whether each traffic channel is available, and other information about the communication devices connected to the traffic channels.

In implementations of PTT communication utilizing talkgroups, the control channel data stream may include information including, for example, information identifying whether a traffic channel is assigned to a talkgroup, information identifying traffic channels assigned to particular talkgroups, and other information about the traffic channels and any talkgroups to which traffic channels are assigned. Such information may allow communication devices to connect with or remain connected to talkgroups as the frequencies or traffic channels associated with the talkgroups are reallocated and as the communication devices move relative to satellites 110 (or as satellites 110 move relative to the communication devices) and the respective beams thereof, which may, for example, result in handoffs being made between beams, satellites, etc.

As described below in more detail, talkgroups may be characterized as either active talkgroups (sometimes referred to as "live" talkgroups) or inactive talkgroups (sometimes referred to as "dead" talkgroups). For example, active talkgroups may be talkgroups on which active communication is currently occurring (e.g., a user is currently speaking into a communication device connected to a talkgroup and the communication device is transmitting the spoken audio in a dedicated transmission mode) or on which active communication has occurred within a particular period of time. Similarly, inactive talkgroups may be talkgroups on which active communication is not currently occurring (e.g., no communication devices are connected to the talkgroup and transmitting in a dedicated transmission mode) or on which active communication has not occurred within a particular period of time.

In some instances, a talkgroup may be determined to be active even if active communication (e.g., speaking) is not currently occurring (or has not occurred within the particular period of time) within the talkgroup. For example, communication devices may determine whether a talkgroup is active or inactive based on information from the control channel indicating whether one or more traffic channels are currently allocated to the talkgroup (or have been allocated to the talkgroup) within the particular period of time, rather than determining whether active communication is actually occurring (or has occurred within the particular period of time). For example, if control channel 0 provides information indicating that traffic channel 1 is currently allocated to talkgroup A or has been allocated to talkgroup A within a particular period of time (e.g., within the last 10 seconds), then a communication device 150 listening to control channel 0 may determine that talkgroup A is an active talkgroup. Alternatively, if control channel 0 provides information indicating that no traffic channels are currently allocated to talkgroup A or that no traffic channels have been allocated to talkgroup A within the particular period of time, then a communication device 150 listening to control channel 0 may determine that talkgroup A is an inactive talkgroup.

In some implementations, traffic channels may be allocated to a talkgroup in response to a request from a communication device provisioned to participate in the talkgroup. For example, if the talkgroup is inactive, no traffic channels may be currently allocated to the talkgroup. In response to a communication device that is provisioned to participate in the talkgroup requesting to participate in the dedicated transmission mode, one or more traffic channels may be allocated to the talkgroup to enable communications over the talkgroup. Thereafter, traffic channel(s) may be maintained for the talkgroup until no devices provisioned to participate in the talkgroup have participated in the talkgroup in the dedicated transmission mode for more than some defined threshold period of time. After the defined threshold period of time elapses with no device provisioned to participate in the talkgroup having participated in the talkgroup in the dedicated transmission mode, the traffic channel(s) allocated to the talkgroup may be torn down and the talkgroup may transition back to an inactive status.

In some implementations, data transmitted in the control channel may explicitly define whether a talkgroup is active or inactive. For example, in some implementations, a centralized entity (e.g., management center 130) may determine whether a talkgroup is active or inactive (e.g., based on whether active communication is occurring or has occurred within a defined period of time within the talkgroup) and transmit an indication of whether the talkgroup is active or inactive within the control channel.

A plurality of talkgroups may be available to particular communication devices or users. For example, available talkgroups for particular communication devices or users may be provisioned by management center 130, gateway 135, or a device 120 based on the communication devices' or users' affiliation with an organization. As an example, one set of available talkgroups may be provisioned for users or devices affiliated with a particular branch or division of the U.S. military, while another set of available talkgroups may be provisioned for a petroleum prospecting company, and still another set of available talkgroups may be provisioned for an airline. Each set of available talkgroups may include a plurality of talkgroups that may only be accessible (e.g., available) to devices or users associated with the organization to which the respective set of available talkgroups was provisioned. Such available talkgroups may, however, utilize the same beams and/or traffic channels, but utilization of the beams and/or traffic channels may be dynamically allocated such that each individual set of available talkgroups remains accessible only to devices or users associated with the organization to which the talkgroups were provisioned. Further, in some implementations, each set of available talkgroups may be affiliated with one or more control channels that carry information about such available talkgroups. In other implementations, certain talkgroups may only be available using a particular access code, for example.

A plurality of communication devices may connect to a control channel, and the data transmitted in the control channel may enable each communication device of the plurality of communication devices (or each user thereof) to select a traffic channel to which such communication device may connect and to determine whether such communication device may be switched to the dedicated transmission mode at a particular instant in time. In some implementations, the control channel may even provide commands or assignments for particular communication devices to connect with particular traffic channels. Further, the control channel or a similar channel may be used for establishing a connection between a first set of one or more communication devices and a second set of one or more communication devices through the Internet or another data network.

In some implementations, communication devices may continuously monitor the control channel. In other implementations, communication devices may selectively or periodically access the control channel, such as when a setting is changed or requested to be changed in the communication device (e.g., changing or requesting to change between a dedicated transmission mode and a dedicated reception mode, changing or requesting to change between talk groups), when the communication device is activated or removed from a sleep or hibernation state, or at predetermined or specified intervals of time. In some implementations, the data in the control channel may be continuously transmitted (e.g., broadcast) to the connected communication devices. In other implementations, the data in the control channel may be periodically or intermittently transmitted (e.g., broadcast) to the connected communication devices. Additionally or alternatively, the data in the control channel may be transmitted (e.g., broadcast) to the connected communication devices in response to the occurrence of or when certain events occur, such as a new communication device connecting to the control channel or when a communication device is activated or switches between the reception mode and the transmission mode, for example.

Figure 2:
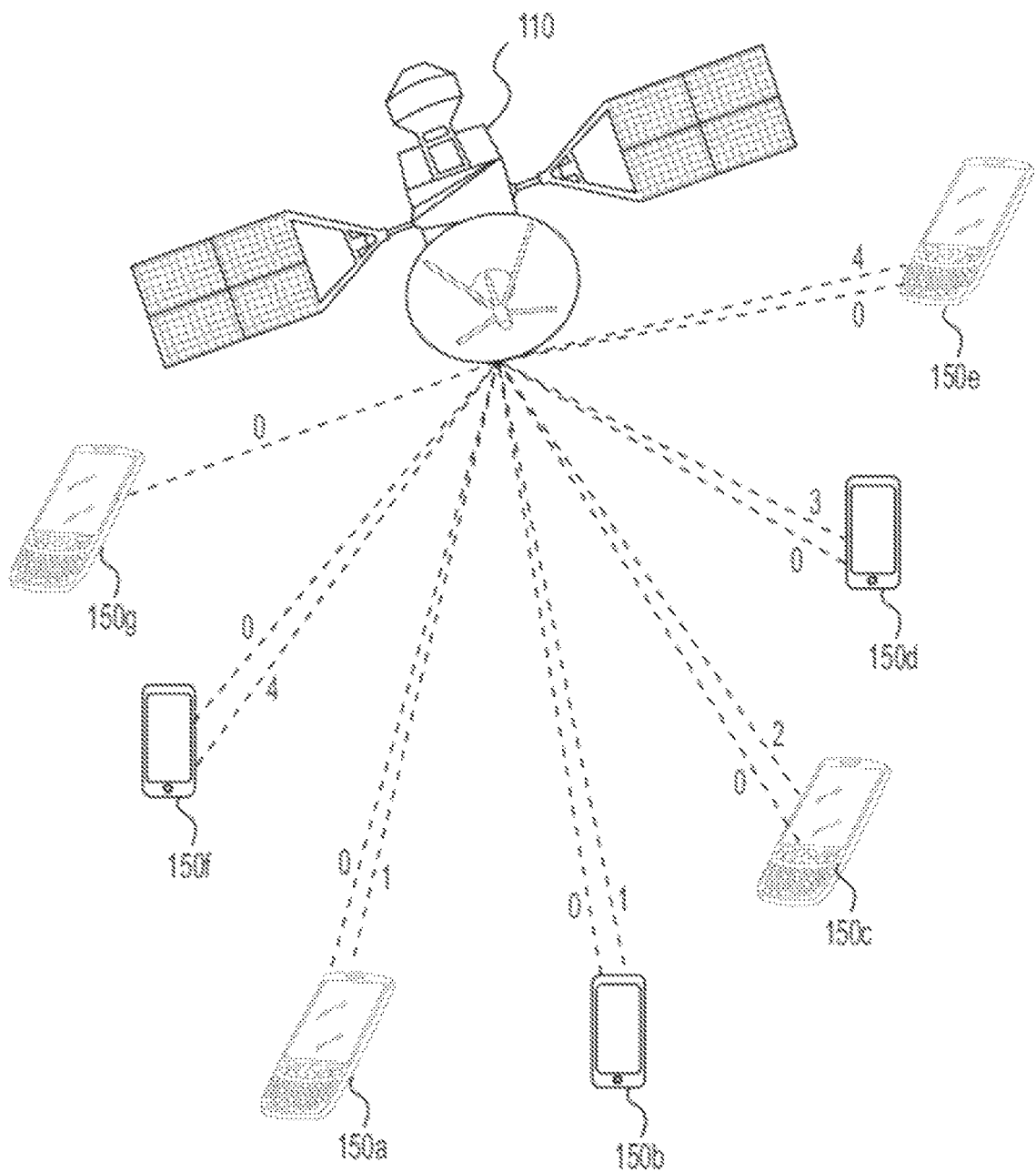
FIG. 2 is a schematic diagram showing a satellite-based implementation of a push-to-talk system, in accordance with particular implementations of the present disclosure.

FIG. 2 shows a schematic of one example of a satellite-based implementation of a PTT system. As shown in FIG. 2, each of communication devices 150 may monitor control channel 0. Some communication devices 150, such as communication devices 150a and 150b, may be set to transmit or receive communications via traffic channel 1. Other communication devices 150, such as communication device 150c, may be set to transmit or receive communications via traffic channel 2. Still other communication devices 150, such as communication device 150d, may be set to transmit or receive communications via traffic channel 3. Additional communication devices 150, such as communication devices 150e and 150f, may be set to transmit or receive communications via traffic channel 4. Certain communication devices 150, such as communication device 150g, may not be set to transmit or receive communications via any of traffic channels 1-4. Furthermore, the settings of communication devices 150a-g may be changed, such that one or more of communication devices 150a-g may be reset to transmit or receive communications via different ones of traffic channels 1-4 than those shown in FIG. 2.

PTT communication systems, such as network 100, may utilize a trunked radio system including a plurality of talkgroups. The trunking function may be implemented by a device 120 or by management center 130, for example. In some implementations, a talkgroup may be implemented generally using a communication channel within a trunked radio system that may function the same as or similarly to a traffic channel as described above; however, in some implementations, unlike a traffic channel assigned to a particular radio frequency, a particular talkgroup may utilize different radio frequencies at different times. A trunked radio system may include a control channel and a limited number of traffic channels. Communication devices using the trunked radio system may monitor the control channel to determine available traffic channels (e.g., traffic channels without current communication activity such as connected devices or active communication transmissions from devices set in a dedicated transmission mode). When a communication device is set to a particular talkgroup, the communication device may either assign an available traffic channel to the particular talkgroup or identify a traffic channel currently assigned to the particular talkgroup. Thereafter, the communication device may begin transmitting or listening on the traffic channel assigned to the talkgroup set on the communication device.

Referring to FIG. 2, communication devices 150a and 150b may both be participating in the same talkgroup, for example. Moreover, each of communication devices 150a-150g may be provisioned to participate in a plurality of talkgroups, such that communication devices 150a-150g may switch back and forth between talkgroups. For example, communication device 150a may be provisioned to participate in a talkgroup currently active on traffic channel 4 and, consequently, may switch into that talkgroup to communicate with communication devices 150e and 150f.

Figure 3:
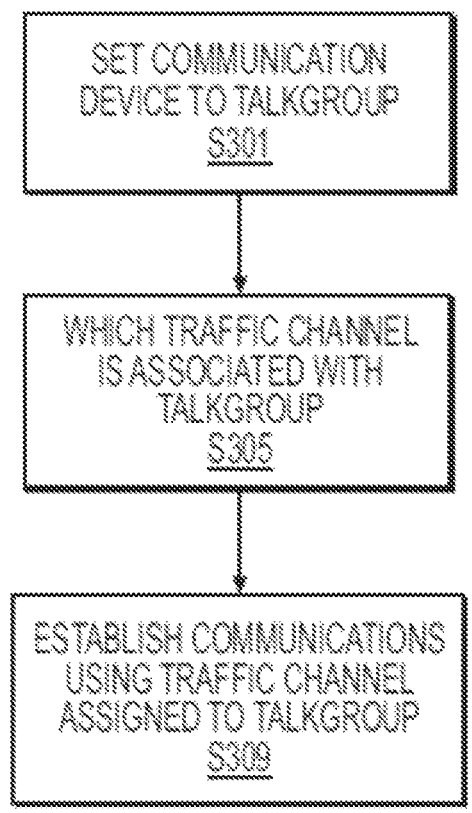
FIG. 3 is a flow chart illustrating a method for establishing communication via one or more talkgroups, in accordance with particular implementations of the present disclosure.

An example of a process of establishing communication via a talkgroup is shown in FIG. 3. In S301, a communication device may be set to a particular talkgroup, such as a talkgroup A, for example. Thereafter, in S305 the communication device may determine which traffic channel to use to connect the communication device to talkgroup A. For example, the communication device may analyze the information from a control channel, such as control channel 0, to determine if a traffic channel already has been assigned to talkgroup A (e.g., because other devices are currently connected to talkgroup A or communicating in talkgroup A). If a traffic channel already has been assigned to talkgroup A, the communication device may use the information from control channel 0 to determine which traffic channel is currently associated with talkgroup A. If a traffic channel has not already been assigned to talkgroup A, the communication device may request that a traffic channel be assigned to talkgroup A. After determining which traffic channel is associated with talkgroup A in S305, the communication device may connect to the assigned traffic channel in S309 and may begin transmitting or listening within talkgroup A.

Management center 130, gateway 135, or a device 120 may be responsible for associating a particular traffic channel with talkgroup A and transmitting this information out through control channel 0 to be received by communication devices 150, for example. Consequently, this information may be added to the control channel and the control channel may include information identifying the particular traffic channel assigned to talkgroup A. This information may be used by other communication devices when such communication devices perform S305 after being set to talkgroup A in S301.

Communication devices may disconnect from a talkgroup by switching to another talkgroup, entering a sleep or hibernation mode, or being deactivated, for example. Accordingly, once all of the devices previously connected to a particular talkgroup disconnect from the particular talkgroup or when no communication is currently being performed via the particular talkgroup (e.g., there are no devices transmitting in a dedicated transmission mode via the particular talkgroup), the traffic channel assigned to the particular talkgroup may become available for use by other talkgroups or for other communication methods. In some implementations, there may be a predetermined or selectable delay period between the time when all of the devices have disconnected from the talkgroup or the time when communication via the talkgroup has terminated and the time when the traffic channel assigned to the particular talkgroup becomes available for use by other talkgroups (e.g., 1 second, 5 seconds, 1 minute, 5 minutes). When a delay period exists, control channel 0 may also wait for the delay period before providing information that the traffic channel previously assigned to the particular talkgroup is available and that the particular talkgroup currently is not established.

In the manner described above, traffic channels may be dynamically allocated among talkgroups to efficiently reduce instances in which traffic channels are unused and to reduce the duration of such disuse. Further, certain users of network 100 may desire more secure communications. By giving these users access to particular talkgroups that frequently cycle through different traffic channels, these users may be able to communicate more securely than would otherwise be possible over a static traffic channel.

Figure 4:
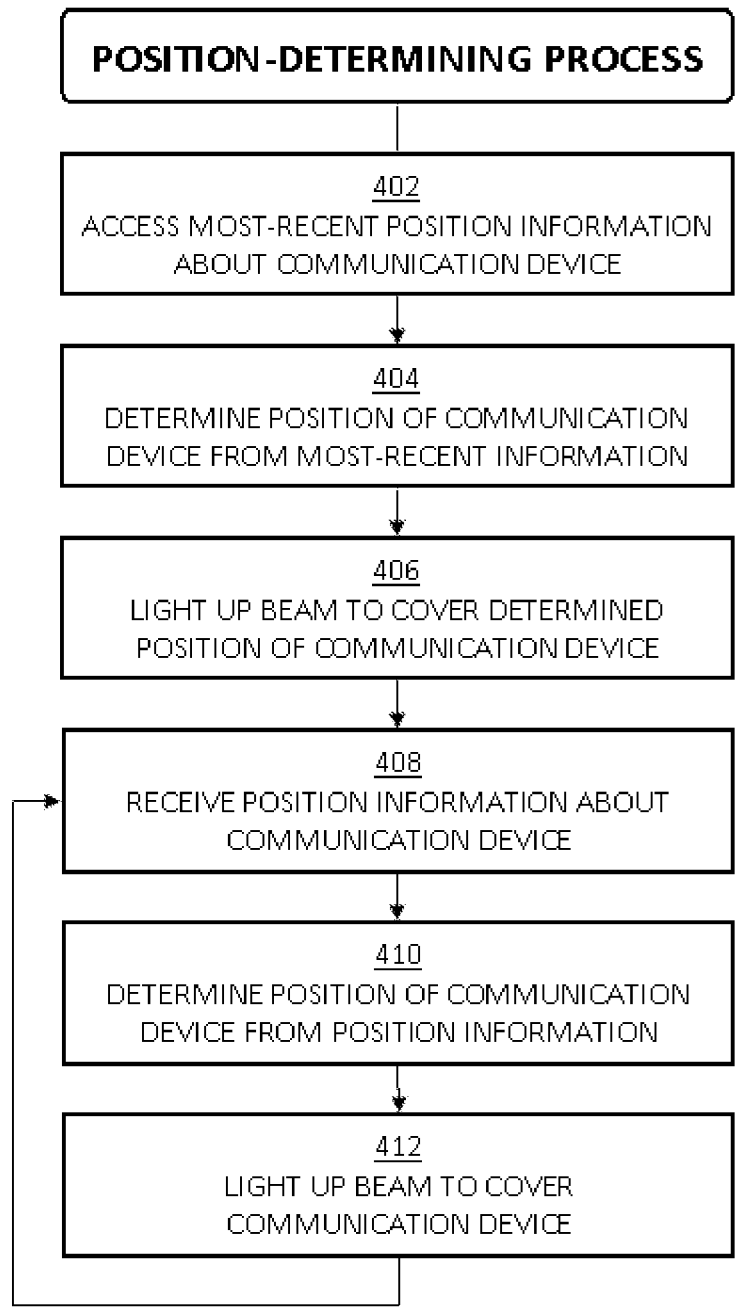
FIG. 4 is a flow chart illustrating a method of periodically determining the position of a communication device, in accordance with particular implementations of the present disclosure.
Figure 5:
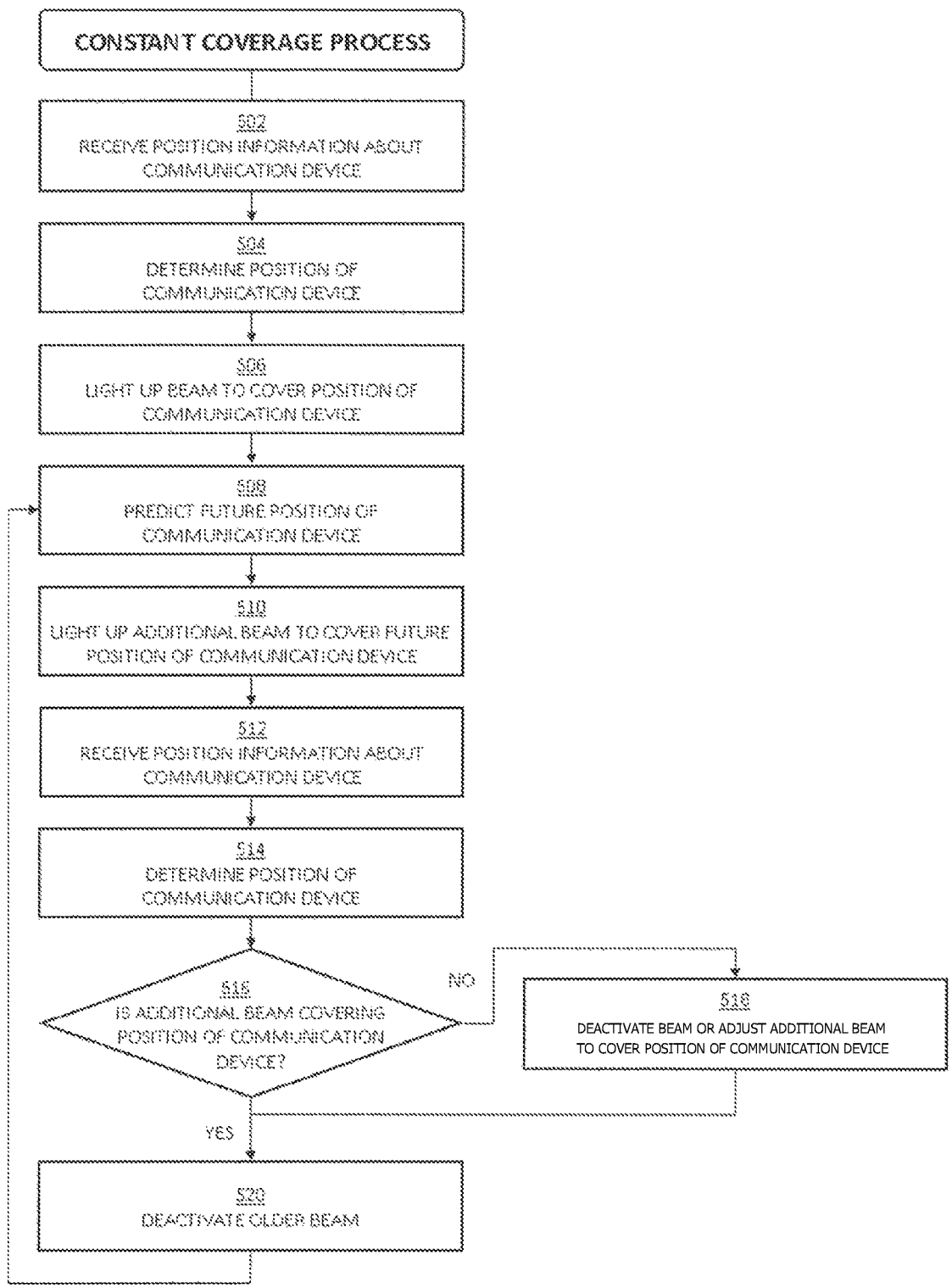
FIG. 5 is a flow chart illustrating a method of using position information about a communication device to provide constant coverage for PTT communications, in accordance with particular implementations of the present disclosure.
Figure 6:
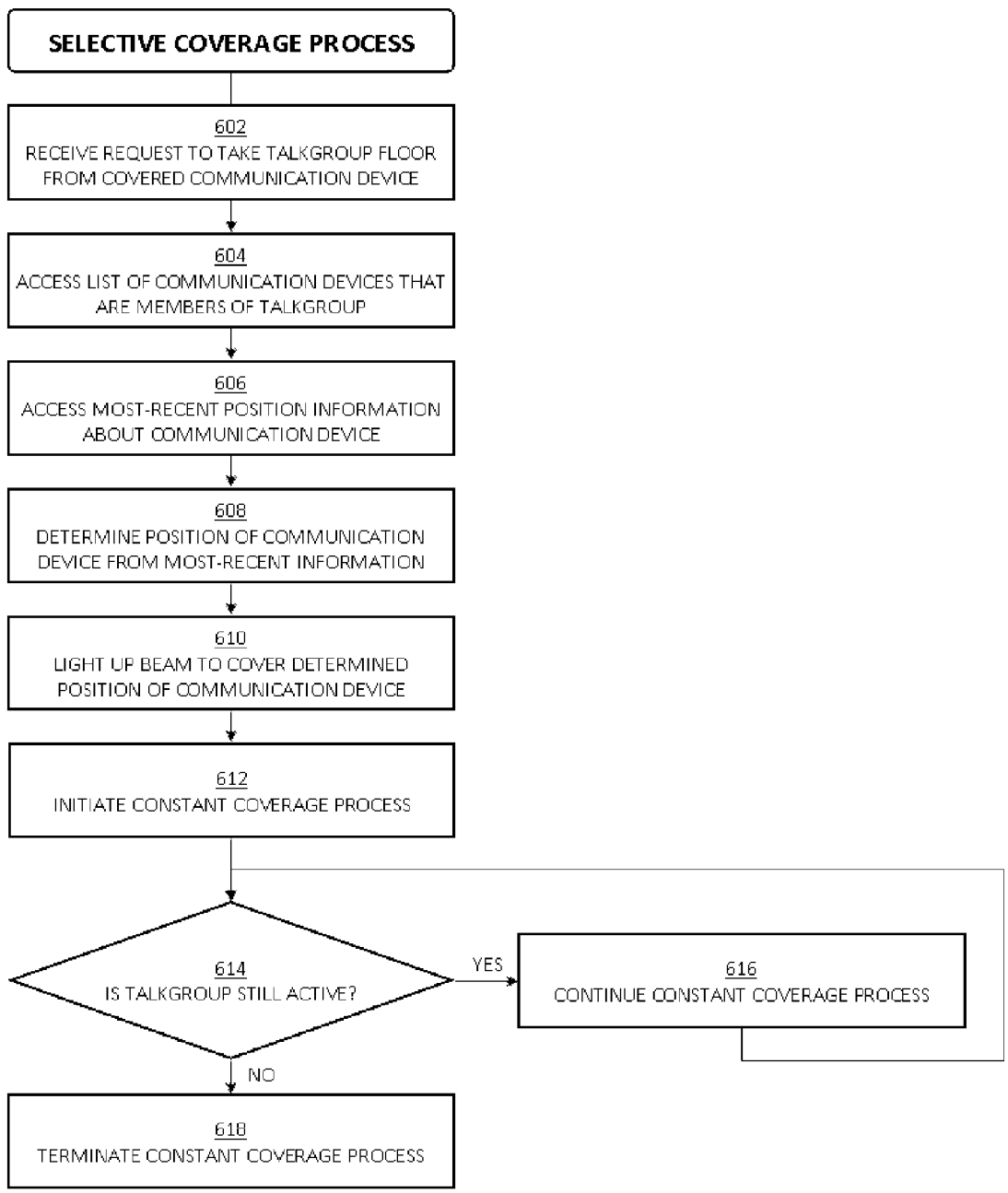
FIG. 6 is a flow chart illustrating a method of using position information about a communication device to provide selective coverage that allows communication devices that are members of a talkgroup to participate in the talkgroup, in accordance with particular implementations of the present disclosure.

Particular implementations of a satellite-based PTT communication system that provides coverage for a mobile communication device that allows the mobile communication device to participate in a talkgroup even when the mobile communication device is not located within a statically defined coverage area for the talkgroup are disclosed with respect to FIGS. 4-6. As indicated above, the ability to provide coverage for a mobile communication device in this fashion may be referred to herein as "follow me" functionality.

FIG. 4 shows a flow chart illustrating a method of periodically determining the position of a communication device, in accordance with particular implementations of the present disclosure.

A particular device or system may initially be made responsible for tracking the position of a communication device 150. In particular, a device 120 connected to management center 130 may be one example of such a responsible device. In some implementations, device 120 may store or have access to a list of communication devices 150 for which "follow me" functionality has been enabled. In some implementations, individual communication devices 150 may be separately provisioned for "follow me" functionality, for example, such that only certain communication devices 150 provisioned to participate in a talkgroup are able to take advantage to the "follow me" functionality. In other implementations, all communication devices 150 that have been provisioned to participate in a talkgroup for which "follow me" functionality is enabled may be provisioned for "follow me" functionality such that all of the communication devices 150 provisioned to participate in the talkgroup can participate in the talkgroup even when they are not located within a statically defined coverage area for the talkgroup.

Communication devices 150 provisioned for "follow me" functionality may transmit signals to satellites 110 indicating that they are provisioned for "follow me" functionality and are to be monitored for position information along with an indication of their current positions. Such communication devices 150 may include GPS receivers or other sensors and related processing capabilities that enable the communication devices 150 to determine their current positions. In some implementations, communication devices 150 may report additional position-related information beyond just their current positions. For example, communication devices 150 also may report their current speed, heading, and the like. After receiving signals from the communication devices 150 indicating that they are provisioned for "follow me" functionality and indicating the communication devices' current positions, the satellites 110 may transmit this information to device 120, for example, via management center 130. Device 120 may receive and store a history of position information about such communication devices 150, for example, by controlling one or more satellites 110 to periodically register and report the position information of such communication devices 150.

In some implementations, the process of FIG. 4 may be initiated when a "follow me" communication device 150 initially leaves, is about to leave, or is deemed likely to be leaving a statically defined coverage area for the talkgroup. In other implementations, the process of FIG. 4 may be ongoing for a "follow me" communication device 150 even when the communication device is within the statically defined coverage area for the talkgroup. In S402, device 120 may access the most-recently obtained position information about a particular communication device 150. In certain implementations, such position information may be position information that was acquired while the particular communication device 150 was in the statically defined coverage area for the talkgroup and stored in a database. In other implementations, such position information may have just (or relatively recently) been received by device 120 from satellites 110 based on a signal transmitted to one or more of the satellites by the communication device 150.

Device 120 may proceed to S404 and use the most-recently obtained position information about the particular communication device 150 to determine an approximate position of the particular communication device 150.

Subsequently, in S406, device 120 may control a satellite 110 to light up one or more beams to provide coverage for the communication device 150 at its currently determined position and/or one or more predicted future positions for the communication device 150 to enable the communication device 150 to participate in the talkgroup. In some implementations, device 120 may control satellite 110 to light up one or more such beams only if device 120 determines that communication device 150 currently is outside of a statically defined coverage area for the talkgroup or the communication device 150 likely will move outside of a statically defined coverage area for the talkgroup within a defined period of time. In certain implementations, device 120 may use a history of the position of the particular communication device 150 to predict the current and/or future position of the particular communication device 150 and control the satellite 110 to light up the beam(s) that provide coverage of the current and/or predicted future position of the particular communication device 150.

In some implementations, lighting up one or more beams that provide coverage of the current and/or predicted future position of the particular communication device 150 may involve allowing the particular communication device 150 to access the control channel(s) associated with the talkgroup within such beams and/or allowing the particular communication device 150 to access one or more traffic channels associated with the talkgroup if the talkgroup is active or if the communication device 150 requests to instantiate the talkgroup. In some implementations, provided that the communication device 150 is provisioned appropriately and the satellites 110 are operating correctly, the communication device 150 may be able to access control channels within all beams. In such implementations, lighting up one or more beams that provide coverage of the current and/or predicted future position of the communication device 150 may involve allocating one or more traffic channels within the beam to the communication device 150 to allow the communication device 150 to participate in the talkgroup without also taking some form of affirmative action to allow the communication device 150 to access a control channel within the beam because the communication device 150 already is able to access the control channel.

The communication device 150 occasionally (e.g., periodically, aperiodically, or in response to one or more triggering events) may report information about its current position to one or more of the satellites 110. In some implementations, the communication device 150 may be configured to transmit information about its position to one or more satellites 110 through control or other channels at some defined frequency (e.g., every minute, every five minutes, etc.). Additionally or alternatively, in some implementations, a satellite 110 may transmit a signal to the communication device 110 through the control channel that includes an instruction for the communication device 150 to transmit a registration signal to the satellite 110, and the satellite 110 may use the registration signal to generate position information for the particular communication device 150. In response, the communication device 150 may transmit the registration signal to the satellite 110. The satellite 110 subsequently may use the registration signal to generate position information about the particular communication device 150 and transmit the position information to device 120 via network 100. In some implementations, the communication device 110 may transmit a registration signal to a satellite 110 without having to be prompted to do so by the satellite 110.

In S408, device 120 may receive the position information about the particular communication device 150. Thereafter, in S410, device 120 may determine the current position of the particular communication device 150 based on the received position information. In some implementations, device 120 also may predict a future position of the particular communication device 150 based on the received position information and/or a history of position information for the particular communication device 150.

Subsequently, in S412, device 120 may control one or more appropriate satellites 110 to light up one or more beams that provide coverage for the currently determined position of the communication device 150 and/or one or more predicted future positions for the particular communication device 150 to enable the communication device 150 to participate in the talkgroup. S412 may be similar to S406.

Thereafter, the process may return to S408, at which time device 120 receives new position information for the particular communication device 150. Device 120 may thereafter continue repeating S408, S410, and S412 until the position determining process ends. In some implementations, the position-determining process may end when the particular communication device 150 is determined to have returned to the statically defined coverage area for the talkgroup. In other implementations, the position-determining process may only end when the particular communication device 150 is powered down, turned off, placed in to a sleep or hibernation mode, or is set to deactivate the "follow me" feature. Moreover, device 120 may store each instance of position information collected in S408 as a history of position information associated with the particular communication device 150.

In particular implementations, if the talkgroup is inactive, a satellite 110 may only light up a beam for the talkgroup as described above in connection with S406 and S412 for a brief interval (e.g., 1 second, 5 seconds) that provides an appropriate amount of time for the communication device 150 to access the control channel (or another channel) and transmit position information to the satellite 110. Additionally or alternatively, device 120 may control satellite 110 to perform S406 or the repeated instances of S412 with a particular period of delay therebetween. For example, device 120 may control satellite 110 to light up one or more beams for the talkgroup once every five minutes. In certain implementations, the period between each repetition of S412 may be based on the coverage area of the one or more beams used and the heading and speed of the particular communication device 150, for example, determined from the history of position information.

FIG. 5 shows a flow chart illustrating a method of using position information about a communication device 150 to provide coverage of the communication device 150 to allow the communication device 150 to participate in a PTT talkgroup when moving, in accordance with particular implementations of the present disclosure. The method of FIG. 5 may be implemented where it is useful to ensure that a particular communication device 150, which has been provisioned to enable "follow me" functionality, is available for PTT communications within a particular talkgroup even if the particular communication device 150 is not located within a statically defined coverage area for the talkgroup. In particular, the method of FIG. 5 may provide a constant coverage area that tightly surrounds the particular communication device 150 as the particular communication device 150 moves and may permit the particular communication device 150 to instantiate the PTT talkgroup or to join and participate in the PTT talkgroup if already instantiated at any time irrespective of the particular communication device's 150 location if the particular communication device 150 is a member of such talkgroup.

The process of FIG. 5 may be performed in conjunction with or separately from the process of FIG. 4 described above. Similar to the process of FIG. 4, the process of FIG. 5 may be may be initiated when a "follow me" communication device 150 initially leaves, is about to leave, or is deemed likely to be leaving a statically defined coverage area for the talkgroup. In other implementations, the process of FIG. 5 may be ongoing for a "follow me" communication device 150 even when the communication device is within the statically defined coverage area for the talkgroup, or the process of FIG. 5 may be activated in response to receiving an activation command, such as a command from a communication device 150, a device 120, or a satellite 110.

In S502, device 120 may receive position information about a particular communication device 150. In certain implementations, device 120 may obtain the most-recently stored position information about the particular communication device 150 from a database. In certain implementations, such position information may be position information that was acquired while the particular communication device 150 was in the statically defined coverage area for the talkgroup and stored in a database. In other implementations, such position information may have just (or relatively recently) been received by device 120 from satellites 110 based on a signal transmitted to one or more of the satellites by the communication device 150. In some implementations, S502 may be the same as S402 or S408 described above or may be subsumed into one or more instances of S402 or S408.

Subsequently, in S504, device 120 may use the received position information to determine the position of the particular communication device 150. In some implementations, S504 may be the same as S404 or S410 described above or may be subsumed into one or more instances of S404 or S410. In S506, device 120 may control one or more satellites 110 to light up one or more beams for the talkgroup that provide coverage of the determined position of the particular communication device 150. As described above, such beams may provide a plurality of traffic channels (e.g., including one or more traffic channels associated with the talkgroup) and control channels that enable the particular communication device 150 to participate in the talkgroup.

In S508, device 120 may predict one or more future positions of the particular communication device 150 using the position information. For example, device 120 may determine the current speed and heading of the particular communication device (e.g., based on speed and heading information received from the communication device or a history of position information of the particular communication device 150) and use this information to determine one or more predicted positions of the particular communication device at some future time. In some implementations, device 120 may determine the amount of time it would take the communication device 150 to move out of the coverage area of the current beam at its current speed and heading. Device 120 may then select a time that occurs before the determined amount of time has passed as the future time. In other implementations, the future time may be a time that occurs when a predetermined period (e.g., one minute or five minutes) has passed.

Thereafter, in S510, device 120 may control one or more satellites 110 to light up beams for the talkgroup that include the one or more predicted future positions of the particular communication device 150 at the future time. These newly lit up beams also may provide a plurality of traffic channels (e.g., including one or more traffic channels associated with the talkgroup) and control channels that enable the particular communication device 150 to participate in the talkgroup.

At or around the future time, in S512, device 120 may receive position information about the particular communication device 150. S512 may be substantially similar to S502. Accordingly, in some implementations, S512 also may be the same as S402 or S408 described above or may be subsumed into one or more instances of S402 or S408. Thereafter, in S514, device 120 may use the received position information to determine the position of the particular communication device 150. S514 may be substantially similar to S504 and may be the same as S404 or S410 described above or may be subsumed into one or more instances of S404 or S410.

In S516, device 120 may determine whether the one or more beams lit up for the talkgroup in S510 cover the current position of the particular communication device 150 previously determined in S514. If device 120 determines that the one of the beams lit up for the talkgroup in S510 is not currently covering the current position of the particular communication device 150 (S516: NO), the process may proceed to S518, and device 120 may control a satellite 110 to deactivate that beam or adjust the position of the beam to cover the current position of the particular communication device 150. In some implementations of S518, in addition or as an alternative to deactivating or adjusting the beam, device 120 may control an appropriate satellite 110 to light up one or more additional beams for the talkgroup.

If device 120 determines that one or more of the beams lip up for the talkgroup in S510 cover the current position of the particular communication device 150 (S516: YES) or after S518 has been completed, the process may proceed to S520. In S520, device 120 may control one or more satellites 110 to deactivate one or more beams previously lit up for the talkgroup that are no longer covering the position of the particular communication device 150. In particular implementations, device 120 may control the satellite 110 to deactivate all beams previously lit up for the talkgroup except for the most-recently lit up beam (e.g., the beam lit up in the most-recent instance of S510 or S518). Thereafter, the process may return to S508, and device 120 may iteratively repeat S508-S520 to maintain constant coverage of the particular communication device 150 by at least one beam while it is moving. In this manner, the particular communication device 150 may be able to join, instantiate, or otherwise participate in a PTT talkgroup at any time while the process of FIG. 5 is being performed.

FIG. 6 shows a flow chart illustrating a method of using position information about a communication device to provide selective coverage that allows communication devices that are members of a talkgroup to participate in the talkgroup, in accordance with particular implementations of the present disclosure. The process of FIG. 6 may be performed in conjunction with or separately from the process of FIG. 4 described above.

Initially, a particular communication device 150 may make a request to take the floor (e.g. enter the dedicated transmission mode) in a talkgroup of which the particular communication device 150 is a member. In particular, the particular communication device 150 may transmit the request to a satellite 110 (e.g., via a control or other channel).

In S602, device 120 may receive, via network 100, information indicating that the particular communication device 150 has requested to take the floor in the talkgroup. Thereafter, in S604, device 120 may access a list of communication devices 150 that are members of the talkgroup (e.g., communication devices 150 that have been provisioned to participate in the talkgroup) in response to receiving the information indicating the request. Subsequently, device 120 may instruct one or more satellites 110 to allocate control and traffic channels for the talkgroup in all of the beams covering a statically defined coverage area for the talkgroup (e.g., such that all of the communication devices 150 provisioned to participate in the talkgroup that currently are located within the statically defined coverage area for the talkgroup can participate in the talkgroup). Additionally or alternatively, device 120 may perform or attempt to perform S606-S618 for each communication device 150 that is a member of the talkgroup (or for each communication device 150 that is a member of the talkgroup and that is provisioned to enable "follow me" functionality), such that these communication devices may participate in the active talkgroup even if they are not located within the statically defined coverage area for the talkgroup.

In S606, device 120 may access position information about the communication device 150. In some implementations, S606 may be the same as S402 or S408 described above or may be subsumed into one or more instances of S402 or S408.

Subsequently, in S608, device 120 may use the position information to determine the position of the communication device 150. In some implementations, S608 may be the same as S404 or S410 described above or may be subsumed into one or more instances of S404 or S410.

In S610, device 120 may control a satellite 110 to light up one or more beams for the talkgroup that cover the determined position of the particular communication device 150. As described above, this may involve allocating at least one control channel and at least one traffic channel for the talkgroup within each of the one or more beams.

Thereafter, in S612, device 120 may initiate the process of FIG. 5. In S614, device 120 may periodically determine whether the talkgroup remains active. When the talkgroup remains active (S614: YES), the process may proceed to S616, and device 120 may continue implementing the process of FIG. 5 and re-evaluating whether the talkgroup is active in S614. When the talkgroup is no longer active (S614: NO), the process may proceed to S618, and device 120 may terminate the process of FIG. 5. At this time, the satellite(s) 110 may stop lighting up beams for the talkgroup that are outside of the statically defined coverage area for the talkgroup but that cover the current position of the communication device 150 until the talkgroup (or another talkgroup of which the communication device 150 is a member) becomes active again. Nevertheless, the position-determining process of FIG. 4 may continue.

In some implementations, device 120 may not perform S606-S618 for communication devices 150 that are located a statically defined coverage area for the talkgroup or for communications devices 150 that have been powered off, that have been placed in a sleep or hibernation mode, or that are unable to provide position information. In particular implementations, device 120 may only perform S606-S618 for select communication devices 150, such as, for example, those indicated by the communication device 150 as requesting the floor, those set to monitor the talkgroup, or those indicated by some sub-list.

In certain implementations, the processes of FIGS. 4-6 described above may be performed for individual communication devices 150. In particular implementations, the processes of FIGS. 4-6 described above may be performed for groups of communication devices 150 in close proximity to one another.

FIG. 7A shows a schematic diagram of a mobile communication device configured to participate in a satellite communication system, including, for example, a satellite-based PTT system, in accordance with particular implementations of the present disclosure. Communication device 150 may include a central processing unit ("CPU") 701A, a memory 702A, and an input/output ("I/O") device 703A.

Memory 702A may store computer-readable instructions that may instruct CPU 701A to perform certain processes. Memory 702A may comprise, for example, RAM, ROM, EPROM, Flash memory, a hard disk drive, a solid state drive, or any suitable combination thereof. When executed by CPU 701A, the computer-readable instructions stored in memory 702A may instruct CPU 701A to operate as one or more devices configured to perform particular functions. In certain implementations, memory 702A may store computer-readable instructions for performing any and all functions or processes described herein, and CPU 701A may execute such computer-readable instructions and operate as one or more devices configured to perform or control such functions or processes. Memory 702A may store data, such as position information, information about provisioned talkgroups, or connection information associated with network 100, for example.

CPU 701A may execute the computer-readable instructions stored in memory 702A, and the computer-readable instructions may instruct CPU 701A to perform or control a plurality of processes including, but not limited to, one or more of the processes described with respect to FIGS. 3-6 and any other process described herein. Accordingly, CPU 701A may be configured to perform a variety of processes, as discussed above in more detail. For example, CPU 701A may be a processor, a controller, an application specific integrated circuit ("ASIC"), or a system comprising a plurality of processors, controllers, or ASICs.

I/O device 703A may receive one or more of data from network 100, data from one or more other devices connected to communication device 150, and input from a user and provide such information to CPU 701A and/or memory 702A. I/O device 703A may transmit data to network 100, may transmit data to one or more other devices connected to communication device 150, and may transmit information to a user (e.g., display the information or indicators thereof, provide audible indications of such information). I/O device 703A may include, for example, one or more of a transceiver, a modem, a network card, a transmitter, a receiver, a microphone, a speaker, an antenna, a light-emitting diode ("LED"), a display device, or any other device configured to provide or receive information.

FIG. 7B shows a schematic illustration of a device 120 configured to implement one or processes for managing communication in a satellite communication system, including, for example, a satellite-based PTT system, in accordance with particular implementations of the present disclosure. Device 120 may include a CPU 701B, a memory 702B, and an I/O device 703B. In some implementations, CPU 701B, a memory 702B, and an I/O device 703B may function similarly to CPU 701A, a memory 702A, and an I/O device 703A. In other implementations, CPU 701B, a memory 702B, and an I/O device 703B may have functionalities different from CPU 701A, a memory 702A, and an I/O device 703A.

Memory 702B may store computer-readable instructions that may instruct CPU 701B to perform certain processes. Memory 702B may comprise, for example, RAM, ROM, EPROM, Flash memory, a hard disk drive, a solid state drive, or any suitable combination thereof. When executed by CPU 701B, the computer-readable instructions stored in memory 702B may instruct CPU 701B to operate as one or more devices configured to perform particular functions. In certain implementations, memory 702B may store computer-readable instructions for performing any and all functions or processes described herein, and CPU 701B may execute such computer-readable instructions and operate as one or more devices configured to perform or control such functions or processes. Memory 702B may store data, such as position information, information about provisioned talkgroups, information about communication devices 150, or operational information associated with network 100, for example.

CPU 701B may execute the computer-readable instructions stored in memory 702B, and the computer-readable instructions may instruct CPU 701B to perform or control a plurality of processes including, but not limited to, one or more of the processes described with respect to FIGS. 3-6 and any other process described herein. Accordingly, CPU 701B may be configured to perform a variety of processes, as discussed above in more detail. For example, CPU 701B may be a processor, a controller, an ASIC, or a system comprising a plurality of processors, controllers, or ASICs.

I/O device 703B may receive one or more of data from network 100, data from one or more other devices connected to communication device 120, and input from a user and provide such information to CPU 701B and/or memory 702B. I/O device 703B may transmit data to network 100, may transmit data to one or more other devices connected to communication device 120, and may transmit information to a user (e.g., display the information or indicators thereof, provide audible indications of such information). I/O device 703B may include, for example, one or more of a transceiver, a modem, a network card, a transmitter, a receiver, a microphone, a speaker, an antenna, a LED, a display device, or any other device configured to provide or receive information.

The flowcharts and diagrams in FIGS. 1-6, 7A-7B, 8A-8H, and 9A-9D illustrate examples of the architecture, functionality, and operation of possible implementations of systems, methods and computer program products according to various aspects of the present disclosure. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a," "an," and "the" are intended to include the plural forms as well, unless the context clearly indicates otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. Moreover, as used herein, the term "user" is intended to refer to one or more of a person, an organization, a computer, or any other entity, apparatus, device, or system.

For example, the terms "communication device," "communication system," "device," and "system" may generally refer to and include satellites 110, satellite links 115, operation hubs 130, devices or systems connected with clouds 140, devices 120, gateways 135, communication devices 150, or any other devices or systems that facilitate the communication of information. Moreover, the terms "management center," "management device," and "management system" may generally refer to and include satellites 110, satellite links 115, management center 130, devices or systems connected with clouds 140, devices 120, gateways 135, communication devices 150, or any other devices or systems that facilitate managing the communication of information. In addition, the term "satellite constellation" may refer to a single satellite or to a plurality of satellites.

While the techniques and implementations disclosed herein have generally been described in the context of satellite-based PTT communication, such techniques and implementations may readily be applied to other communication systems. For example, the techniques and implementations disclosed herein may be applied to cellular-based PTT communication systems, other terrestrial-based PTT communication systems, land mobile radio ("LMR") communication systems, hybrid communication systems using one or more of the communication systems described herein or apparent to one of skill in the art, or any other communication systems conceivable by one of skill in the art.

Aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented entirely in hardware, entirely in software (including firmware, resident software, micro-code, etc.) or in combinations of software and hardware that may all generally be referred to herein as a "circuit," "module," "component," or "system." Furthermore, aspects of the present disclosure may take the form of a computer program product embodied in one or more computer-readable media having computer-readable program code embodied thereon.

Any combination of one or more computer-readable media may be utilized. The computer-readable media may be a computer-readable signal medium or a computer-readable storage medium. A computer-readable storage medium may be, for example, but not limited to, an electronic, magnetic, optical, electromagnetic, or semiconductor system, apparatus, or device, or any suitable combination of the foregoing. More specific examples (a non-exhaustive list) of such a computer-readable storage medium include the following: a portable computer diskette, a hard disk, a random access memory ("RAM"), a read-only memory ("ROM"), an erasable programmable read-only memory ("EPROM" or Flash memory), an appropriate optical fiber with a repeater, a portable compact disc read-only memory ("CD-ROM"), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable signal medium may be transmitted using any appropriate medium, including but not limited to satellite communications, wireless, wireline, optical fiber cable, RF signals, etc., or any suitable combination of the foregoing.

Computer program code for carrying out operations for aspects of the present disclosure may be written in any combination of one or more programming languages, including an object oriented programming language, such as JAVA, C++, C#, or other suitable programming languages. The program code may execute entirely on a user's device, partly on a user's device, as a stand-alone software package, partly on a user's device and partly on a remote computer, or entirely on a remote computer or server. In the latter scenario, a remote computer may be connected to a user's device through any type of network, including a satellite communications network, a local area network ("LAN"), or a wide area network ("WAN"), or the connection may be made to an external computer (for example, through the Internet using an Internet Service Provider) or offered as a service, such as, for example, a Software as a Service ("SaaS"), e.g., over a secure web interface via a https connection.

Aspects of the present disclosure are described herein with reference to flowchart illustrations and/or block diagrams of methods, apparatuses (including systems), and computer program products. Individual blocks of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer-readable medium. When accessed from the computer-readable medium and executed, the computer program instructions may direct a computer, other programmable data processing apparatus, or other devices to function in a particular manner, such that the instructions when stored in the computer-readable medium produce an article of manufacture including instructions that, when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to explain the principles of the disclosure and the practical application, and to enable others of ordinary skill in the art to understand the disclosure with various modifications as are suited to the particular use contemplated.

What is claimed is:

1. A method comprising:
   receiving information indicating that a first communication device is requesting to enter a dedicated transmission mode in a talkgroup;
   receiving first information indicating a first position of the first communication device;
   controlling a satellite constellation to establish a first communication channel for communications for the talkgroup within a first beam that has a coverage area including the first position of the first communication device;
   determining a potential second position of the first communication device; and
   controlling the satellite constellation to establish a second communication channel for communications for the talkgroup within a second beam that has a coverage area including the potential second position of the first communication device.

2. The method of claim 1, further comprising:
   receiving second information indicating a second position of the first communication device;
   determining that the coverage area of the second beam includes the second position of the first communication device;
   in response to determining that the coverage area of the second beam includes the second position of the first communication device, controlling the satellite constellation to discontinue the first communication channel within the first beam;

determining a potential third position of the first communication device using the first information and the second information; and controlling the satellite constellation to establish a third communication channel for communications for the talkgroup within a third beam that has a coverage area including the potential third position of the first communication device.

3. The method of claim 1, wherein the coverage area of the first beam overlaps with the coverage area of the second beam.

4. The method of claim 1, further comprising:

receiving information indicating that the talkgroup is inactive while the first communication channel is established within the first beam and the second communication channel is established within the second beam; and in response to receiving the information indicating that the talkgroup is inactive, controlling the satellite constellation to discontinue the first communication within the first beam and the second communication channel within the second beam.

5. The method of claim 1, further comprising:

receiving second information indicating a second position of the first communication device;

determining that the coverage area of the second beam does not include the second position of the first communication device; and controlling the satellite constellation to adjust the second beam to make the coverage area of the second beam include the second position of the first communication device.

6. The method of claim 1, further comprising:

in response to receiving the information indicating that the first communication device is requesting to enter the dedicated transmission mode in the talkgroup, identifying a second communication device that is a member of the talkgroup;

receiving additional information indicating a first position of the second communication device;

controlling the satellite constellation to establish a third communication channel for communications for the talkgroup within a third beam that has a coverage area including the first position of the second communication device;

determining a potential second position of the second communication device; and controlling the satellite constellation to establish a fourth communication channel for communications for the talkgroup within a fourth beam that has a coverage area including the potential second position of the second communication device.

7. A system comprising:

a plurality of communication devices permitted to participate in a talkgroup, the plurality of communication devices comprising:

a first communication device; and a second communication device;

a satellite constellation configured to generate a plurality of beams including a plurality of carriers; and a controller configured to control the satellite constellation, wherein the first communication device is configured to transmit to the satellite constellation a request to enter a dedicated transmission mode in the talkgroup, wherein, in response to receiving the request to enter the dedicated transmission mode in the talkgroup, the satellite constellation is configured to transmit to the controller information indicating that the first communication device is requesting to enter the dedicated transmission mode in the talkgroup, and wherein the controller is configured to:

in response to receiving the information indicating that the first communication device is requesting to enter the dedicated transmission mode in the talkgroup, obtain first information indicating a first position of the second communication device;

control the satellite constellation to establish a first carrier for communications for the talkgroup within a first beam that has a coverage area including the first position of the second communication device;

determine a potential second position of the second communication device; and control the satellite constellation to establish a second carrier for communications for the talkgroup within a second beam that has a coverage area including the potential second position of the second communication device.

8. The system of claim 7, wherein at least one of the first carrier and the second carrier periodically carries an instruction to transmit a registration signal, wherein, in response to receiving the instruction to transmit the registration signal, the second communication device is configured to transmit the registration signal to the satellite constellation, and wherein the satellite constellation is configured to:

determine a second position of the second communication device using the registration signal received from the second communication device; and transmit to the controller second information indicating the second position of the second communication device.

9. The system of claim 8, wherein the controller is configured to:

determine that the coverage area of the second beam includes the second position of the second communication device;

in response to determining that the coverage area of the second beam includes the second position of the second communication device, control the satellite constellation to discontinue the first carrier within the first beam;

determine a potential third position of the second communication device using the first information and the second information; and control the satellite constellation to establish a third carrier for communications for the talkgroup within a third beam that has a coverage area including the potential third position of the second communication device.

10. The system of claim 8, wherein the controller is configured to:

determine that the coverage area of the second beam does not include the second position of the second communication device; and control the satellite constellation to adjust the second beam to make the coverage area of the second beam include the second position of the second communication device.

11. The system of claim 7,
wherein the first communication device is disposed in a wide coverage area, the wide coverage area being a fixed geographic area for which one or more satellites of the satellite constellation provide substantially continuous availability for the talkgroup regardless of whether any of the plurality of communication devices are disposed in such geographic area, and
wherein the second communication device is disposed in a tightly-focused coverage area, the tightly-focused coverage area being a geographic area different from the wide coverage area in which one or more satellites of the satellite constellation provide availability for the talkgroup only when at least one of the plurality of communication devices is disposed in such geographic area.

12. The system of claim 7, wherein the controller is configured to:
receive information indicating that the talkgroup is inactive while at least one of the first carrier within the first beam and the second carried within the second beam is established; and
in response to receiving the information indicating that the talkgroup is inactive, control the satellite constellation to discontinue the at least one of the first carrier and the second carrier.

13. The system of claim 7, wherein the controller is configured to:
in response to receiving the information indicating that the first communication device is requesting to enter the dedicated transmission mode in the talkgroup, obtain additional information indicating a first position of the first communication device;
control the satellite constellation to generate a third carrier for communications for the talkgroup within a third beam that has a coverage area including the first position of the first communication device;
determine a potential second position of the first communication device; and
control the satellite constellation to establish a fourth carrier for communications for the talkgroup in a fourth beam that has a coverage area including the potential second position of the first communication device.

14. The system of claim 7, wherein the controller is configured to:
in response to receiving the information indicating that the first communication device is requesting to enter the dedicated transmission mode in the talkgroup, obtain additional information indicating a first position of the first communication device;
determine if the first communication device and the second communication device are disposed within a threshold distance of each other using the first information and the additional information; and
in response to determining that the first communication device and the second communication device are disposed within the threshold distance of each other, control the satellite constellation to adjust the first beam to make the coverage area of the first beam include the first position of the first communication device and the first position of the second communication device.

15. A system comprising:
a processing system; and
a memory configured to store computer-readable instructions that, when executed by the processing system, instruct the processing system to perform processes comprising:
receiving information indicating that a first communication device, which is permitted to participate in a talkgroup, is requesting to enter a dedicated transmission mode in the talkgroup;
in response to receiving the information indicating that the first communication device is requesting to enter the dedicated transmission mode in the talkgroup, identifying a second communication device that is a member of the talkgroup;
in response to identifying the second communication device, obtaining first information indicating a first position of the second communication device;
controlling a satellite constellation to establish a first channel for communications for the talkgroup within a first beam that has a coverage area including the first position of the second communication device;
determining a potential second position of the second communication device; and
controlling the satellite constellation to establish a second channel for communications for the talkgroup within a second beam that has a coverage area including the potential second position of the second communication device.

16. The system of claim 15, wherein the computer-readable instructions, when executed by the processing system, instruct the processing system to perform further processes comprising:
receiving second information indicating a second position of the second communication device;
determining that the coverage area of the second beam includes the second position of the second communication device;
in response to determining that the coverage area of the second beam includes the second position of the second communication device, controlling the satellite constellation to discontinue the first communication channel within the first beam;
determining a potential third position of the second communication device using the first information and the second information; and
controlling the satellite constellation to establish a third channel for communications for the talkgroup within a third beam that has a coverage area including the potential third position of the second communication device.

17. The system of claim 15, wherein the computer-readable instructions, when executed by the processing system, instruct the processing system to perform further processes comprising:
receiving information indicating that the talkgroup is inactive while at least one of the first channel and the second channel is established; and
in response to receiving the information indicating that the talkgroup is inactive, controlling the satellite constellation to discontinue the at least one of the first channel and the second channel.

18. The system of claim 15, wherein the computer-readable instructions, when executed by the processing system, instruct the processing system to perform further processes comprising:
receiving second information indicating a second position of the second communication device;
determining that the coverage area of the second beam does not include the second position of the second communication device; and controlling the satellite constellation to adjust the second beam to make the coverage area of the second beam include the second position of the second communication device.

19. The system of claim 15, wherein the computer-readable instructions, when executed by the processing system, instruct the processing system to perform further processes comprising:

in response to receiving the information indicating that the first communication device is requesting to enter the dedicated transmission mode in the talkgroup, obtaining additional first information indicating a first position of the first communication device;

controlling the satellite constellation to establish a third channel for communications for the talkgroup within a third beam that has a coverage area including the first position of the first communication device;

determining a potential second position of the first communication device; and controlling the satellite constellation to establish a fourth channel for communications for the talkgroup within a fourth beam that has a coverage area including the potential second position of the first communication device.

20. The system of claim 15, wherein the coverage area of the first beam overlaps with the coverage area of the second beam.

* * * * *